US011023973B2

(12) United States Patent
Køber et al.

(10) Patent No.: US 11,023,973 B2
(45) Date of Patent: *Jun. 1, 2021

(54) TRAILBLAZER METHODS, APPARATUSES AND MEDIA

(71) Applicant: REFINITIV US ORGANIZATION LLC, New York, NY (US)

(72) Inventors: Magnus E. Køber, Oslo (NO); Geir Arne Hjelle, Oslo (NO)

(73) Assignee: Refinitiv US Organization LLC, New York, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/562,763

(22) Filed: Sep. 6, 2019

(65) Prior Publication Data

US 2019/0392524 A1 Dec. 26, 2019

Related U.S. Application Data

(63) Continuation of application No. 14/170,191, filed on Jan. 31, 2014, now Pat. No. 10,410,285.
(Continued)

(51) Int. Cl.
*G06Q 40/00* (2012.01)
*G06Q 40/04* (2012.01)
*G06Q 50/06* (2012.01)

(52) U.S. Cl.
CPC ............ *G06Q 40/04* (2013.01); *G06Q 50/06* (2013.01)

(58) Field of Classification Search
CPC ........ G06Q 40/06; G06Q 40/04; G06Q 10/00; G06Q 10/067; G06Q 30/02; G06Q 30/0207; G06Q 30/0282; G06Q 30/08
See application file for complete search history.

(56) References Cited

U.S. PATENT DOCUMENTS 6,341,271 B1 * 1/2002 Salvo ................ G06Q 10/087
705/28
7,353,201 B2 4/2008 Bjelogrlic
(Continued)

OTHER PUBLICATIONS

InvestingAnswers ("Commodity" http://web.archive.org/web/20111118185210/http://www.investinganswers.com/financial-dictionary/commodities-precious-metals/commodity-1035. InvestingAnswers Nov. 18, 2011) (Year: 2011).*
(Continued)

*Primary Examiner* — Sarah M Monfeldt
*Assistant Examiner* — Mark H Gaw
(74) *Attorney, Agent, or Firm* — Winthrop & Weinstine, P.A.

(57) ABSTRACT

At a first time, an indication of a selection of a contract, expiring at a second time and associated with a commodity, is received. A set of physical stacks associated with the contract is accessed. Based upon the first time, the second time, and a periodic sampling rate, a marginal cost profile for the commodity is generated. The marginal cost profile is a set of values relating to an estimate of a marginal cost of production for the commodity at a set of times between the first time and the second time. A display signal, adapted to form the basis for a visual display, is generated. The display signal includes a first component relating to at least one physical stack from the set of physical stacks, and a second component relating to the marginal cost profile. The display signal is stored in a memory and transmitted from the memory.

19 Claims, 14 Drawing Sheets

Related U.S. Application Data

(60) Provisional application No. 61/760,315, filed on Feb. 4, 2013.

(56) References Cited

U.S. PATENT DOCUMENTS

| | | | |
|---|---|---|---|
| 10,410,285 | B2 | 9/2019 | Køber et al. |
| 2002/0055899 | A1 | 5/2002 | Williams |
| 2003/0009415 | A1* | 1/2003 | Lutnick .................. G06Q 40/04 705/37 |
| 2003/0018490 | A1* | 1/2003 | Magers .................. G06Q 10/06 703/6 |
| 2005/0240539 | A1* | 10/2005 | Olavson ................ G06Q 40/04 705/400 |
| 2008/0236616 | A1* | 10/2008 | Bloch .................... F16L 57/06 134/2 |
| 2010/0023457 | A1 | 1/2010 | Riviere |
| 2010/0070343 | A1 | 3/2010 | Taira et al. |
| 2010/0088261 | A1* | 4/2010 | Montalvo ................ H02J 3/14 706/15 |
| 2010/0292856 | A1* | 11/2010 | Fujita .................... G06Q 50/06 700/291 |
| 2012/0278222 | A1 | 11/2012 | Kirch |

OTHER PUBLICATIONS

IP/Australia Patent Office. Australian Patent No. 2014210879 granted Mar. 2, 2017, 311 pages. www.ipaustralia.gov.au/patents.

Investopedia ("Economics Basics: Demand and Supply" Investopedia http://www.investopedia.com/university/economics/economics3.asp Jan. 1, 2007).

WAHM.com ("Small Business Planning: How to Forecast Revenue" WAHM.com http://www.wahm.com/articles/small-business-planning-how-to-forecast-revenue.html May 28, 2010).

Talluri, Sri ("A methodology for strategic sourcing" Michigan State University: Department of Marketing and Supply Chain Management http://www.researchgate.net/publication/222434112_A_methodology_for_strategic_sourcing Jan. 2004).

Heer, Jeffrey "Software Design Patterns for Information Visualization" IEEE Transactions on Visualization and Computer Graphics http://vis.stanford.edu/files/2006-DesignPatterns-InfoVis.pdf Sep./Oct. 2006.

SME.com.ph ("Demand Forecasting" SME.com.ph http://web.archive.org/web/20090204103620/http://smetoolkit.org/smetoolkit/en/content/en/416/Demand-Forecasting Feb. 4, 2009).

The Fund for the Improvement of Postsecondary Education ("Review of Bar Graphs" http://cstl.syr.edu/fipse/TabBar/RevBar/REVBAR.HTM Jul. 21, 2001).

Wikipedia ("Graphical user interface" http://en.wikipedia.org/wiki/Graphical_user_interface. Dec. 1, 2005).

InvestingAnswers "Commodity" http://web.archive.org/web/20111118185210/http://www.investinganswers.com/financial-dictionary/commodities-precious-metals/commodity-1035 InvestingAnswers Nov. 18, 2011.

Wikipedia ("Mouseover" wikipedia.org. http://en.wikipedia.org/wiki/Mouseover. Dec. 15, 2005).

Wikipedia ("Mouseover" wikipedia.org. http://en.wikipedia.org/wiki/Mouseover. Dec. 15, 2005, retitled "Wiki-hovering-over" for clarity) (Year 2005).

Wikipedia ("Graphical user interface" http://en.wikipedia.org/wiki/Graphical_user_interface. Dec. 1, 2005). (Year 2005).

International Search Report for related PCT application, PCT/IB2014/000691, dated Jul. 30, 2014.

* cited by examiner

EXEMPLARY TRAILBLAZER VISUALIZATION

EXEMPLARY TRAILBLAZER VISUALIZATION

EXEMPLARY TRAILBLAZER VISUALIZATION

EXEMPLARY TRAILBLAZER COMMODITY PRICE CALCULATING (CYPC) COMPONENT

EXEMPLARY TRAILBLAZER CONTRACT PRICE CALCULATING (CTPC) COMPONENT

EXEMPLARY TRAILBLAZER CONTRACT PRICE VISUALIZING (CTPV) COMPONENT

EXEMPLARY TRAILBLAZER COMMODITY PRICE VISUALIZING (CYPV) COMPONENT

EXEMPLARY TRAILBLAZER SUPPLY VISUALIZING (SV) COMPONENT

EXEMPLARY TRAILBLAZER DEMAND VISUALIZING (DV) COMPONENT

EXEMPLARY TRAILBLAZER SUPPLY SOURCES VISUALIZING (SSV) COMPONENT

EXEMPLARY TRAILBLAZER COORDINATOR

TRAILBLAZER METHODS, APPARATUSES AND MEDIA

CROSS-REFERENCE TO RELATED APPLICATION

This patent application is a continuation of U.S. patent application Ser. No. 14/170,191, filed on Jan. 31, 2014 and issued as U.S. Pat. No. 10,410,285 on Sep. 10, 2019, which in turn claims the benefit of priority to U.S. provisional patent application No. 61/760,315, filed Feb. 4, 2013, entitled "Systems and Methods for Modeling Electrical Power Markets,". The entire contents of the aforementioned applications are herein expressly incorporated by reference in their entireties for any purpose whatsoever.

This disclosure describes TRAILBLAZER METHODS, APPARATUSES AND MEDIA (hereinafter "TRAILBLAZER"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

FIELD

The present disclosure is directed generally to modeling platforms.

BACKGROUND

Currently, a commodity market participant, such as a power market trader, would rely on a montage of discrete data points, news and elements of forecasting, such as weather, current quoted market prices, and various historical charts, to analyze a commodity market. The commodity market participant would then attempt to put these data points into context and identifying trading opportunities.

SUMMARY

The purpose and advantages of the present disclosure will be set forth in, and be apparent from, the description that follows, as well as will be learned by practice of the invention. Additional advantages of the disclosure will be realized and attained by the methods and systems particularly pointed out in the written description and claims hereof, as well as from the appended drawings.

To achieve these and other advantages and in accordance with the purpose of the disclosure, as embodied and broadly described, in accordance with one embodiment, the disclosure can include various computer implemented methods relating to commodities. One illustrative method can include receiving via processor, at a first time, an indication of a selection of a contract, the contract expiring at a second time, the contract can be associated with a commodity. The method can further include accessing data via processor relating to a set of contracts associated with the cost of the commodity from a plurality of sources. Based upon the first time, the second time, and a time sampling interval, a marginal cost profile can be generated for the commodity via processor. The marginal cost profile can be a set of values relating to an estimate of a marginal cost of the commodity at a set of times between the first time and the second time. The method can further include generating a display signal via processor. The display signal can be adapted to form the basis for a visual display. The display signal can include at least one visual compilation of the data relating to the set of contracts and the marginal cost profile. The method can also include storing the display signal in a memory, and transmitting the display signal from the memory.

If desired, the display signal can further include a third component that in turn can include a first sub-component relating to the set of contracts, wherein the selected contract is from the set of contracts, and a second sub-component relating to a set of predictions. The set of predictions can be a predicted set of prices for the commodity during a plurality of points in time between the first time and the second time. Each point of time can be separated by an amount of time equal to the time sampling interval. In some embodiments, the method can further include creating a physical stack representation of the set of contracts. This may be achieved by accessing a first set of information via processor relating to a first entity, accessing a second set of information relating to a second entity that is preferably independent from the first entity, and applying a model to the first set of information and the second set of information to create the physical stack representation. The first and second entities can be producers or suppliers of the commodity. Any desired time sampling interval can be used, such as thirty minutes, one hour, or as otherwise desired. While the commodity can be any suitable commodity, in various illustrated implementations herein, the commodity is electricity.

In further accordance with the disclosure, further embodiments of a computer implemented method are provided. An example of such a method can include obtaining a market selection for a commodity via processor, calculating a price for the commodity via processor and obtaining supplier data for the selected market, obtaining demand data for the selected market. The method can further include determining a first future time interval for which to calculate an estimate of the commodity price, calculating an estimate of the commodity price for the first future time interval, and generating a signal indicative of a visualization of a supply stack that displays the price of production of a plurality of producers of the commodity during the first future time interval. In some embodiments, the commodity can be electrical power.

If desired, calculating the price for the commodity can include accounting for an event that may affect commodity price for the market. The event can include, for example, (i) a supplier outage, (ii) a fuel price update, (iii) a demand forecast update and (iv) a new weather forecast, among others. The supplier data can include, for example, a list of suppliers associated with the selected market and at least one of (i) fuel type, (ii) cost based on fuel price or weather (iii) geographic location, (iv) installed capacity and (v) outages. The demand data can include, for example, at least one of (i) commodity demand information for the market and (ii) commodity demand information, for different price areas within the market. In some embodiments, the time interval can be specified in a data store, and/or directly.

If desired, the method can include aggregating suppliers into groups. For example, the suppliers can be aggregated into a predetermined number of groups to facilitate generating the visualization of the supply stack. If desired, the method can further include determining whether there is a second future time interval for which to calculate a commodity price. If so, the method can further include selecting the second future time interval for analysis, then determining whether an additional supplier needs to be analyzed for the second future time interval. The method may thus include determining the additional supplier's additional capacity and/or cost during the second future time interval, as well as demand during the second future time interval.

In some embodiments, demand during the second future time interval can be determined with reference to a demand forecast during the second future time interval. If desired, the method can further include calculating a commodity price for the second future time interval. If desired, the commodity price for the second future time interval can be calculated based on an intersection point of a supply curve and a demand curve. The supply curve can be formed based on data regarding available capacity and cost, and the demand curve can be formed based on demand during the second future time interval. The commodity price can be based on the cost of the most expensive supplier used in order to fulfill the demand during the second future time interval. If desired, the commodity price can be based on the average of costs of suppliers used in order to fulfill the demand during the second future time interval. The method can still further include storing the calculated commodity price. The calculated commodity price can include data that includes at least one of (i) an estimate identifier, (ii) information indicating whether the value of the estimate can be a main, high or low price estimate, (iii) a forecast date timestamp indicating when the estimate was made, (iv) a time interval associated with the estimate and (v) a value associated with the commodity price estimate.

The disclosure also provides an exemplary computer implemented method that includes identifying and selecting a contract relating to purchase of a commodity via processor, determining at least one future time interval associated with the contract, determining a price for a commodity associated with the contract via processor during the at least one future time interval, and calculating a price for the contract based on the determined price for the commodity during the at least one future time interval.

In some embodiments, the future time interval can be (i) at least one day in the future, (ii) at least one week in the future or (iii) at least one month in the future, among others. If desired, a plurality of future time intervals can be analyzed. The method can further include determining an estimate of the commodity price for a commodity associated with the contract for a plurality of time intervals. The price for the contract can be calculated based on an average of commodity prices for a plurality of analyzed time intervals. If desired, the method can further include determining and if desired, displaying an uncertainty band associated with the contract price based on alternative commodity price values.

The disclosure further provides a computer implemented method that includes receiving a commodity contract selection request via processor, determining a market price of the selected commodity contract over a first time period via processor, determining a predicted price of the commodity contract over a second time period, and generating a signal for displaying a visualization of at least one of the market price and predicted price via processor.

If desired, the first time period can be predetermined and/or can be between market opening time and the current time. The first time period can be specified by a user. The user can specify the first time period by selecting a graphical data representation. If desired, the second time period can be predetermined and/or be specified by a user. The method can further include determining whether an uncertainty band for the predicted price of the commodity should be displayed to a user. The method can further include determining the upper bound and the lower bound of the uncertainty band.

The visualization can include a graph of the market price of the selected contract during the first time period. In some embodiments, the visualization can include a graph of the predicted price of the selected contract during the second time period. If desired, the visualization can include a graph of an uncertainty band of the predicted price of the selected contract during the second time period. If desired, the method can further include analyzing an update event to determine if the market price or predicted price of the selected contract should be updated. The update event can be based on a tick-level update to the market price of the contract based on real-time data from a financial exchange. The update event can occur based on a recalculation of the predicted price of the contract based on an event affecting the predicted price of the contract. The method can further include generating an updated signal for displaying an updated visualization of at least one of the market price and predicted price via processor.

The disclosure further provides a computer implemented method that includes receiving a commodity contract information request via processor, determining a first future time period to analyze with respect to the commodity contract via processor, determining a commodity price during the first future time period for the commodity associated with the contract, and generating a signal for displaying a visualization of the commodity price during the first future time period via processor.

If desired, the first future time period can be predetermined or specified by a user. The user can specify the first future time period by selecting a graphical data representation, for example. The method can further include determining whether an uncertainty band should be displayed with respect to the commodity price. If desired, the method can further include determining the upper bound and the lower bound of the uncertainty band.

The disclosure still further provides a computer implemented method that includes receiving a commodity supplier information request from a user via processor, receiving a commodity contract selection from the user via processor, determining a first future time period associated with the commodity contract via processor, determining an available capacity of the commodity associated with the commodity contract from the commodity supplier during the first future time period via processor, and generating a signal via processor for displaying a visualization of the available capacity of the commodity associated with the commodity contract from the commodity supplier during the first future time period. In some implementations, the method can further include generating and sending a signal can include identifier information of the commodity supplier to the user.

The disclosure yet further provides a computer implemented method that includes receiving a request for information relating to an event occurring during a first time selection from a user, receiving a commodity contract selection request via processor from the user, determining a first future time period to analyze with respect to the commodity contract, determining predicted demand during the first future time period for the commodity associated with the commodity contract predicted as of the time selection, and generating a signal for displaying a visualization of the predicted demand for the commodity during the first future time period via processor. If desired, the method can further include determining whether an uncertainty band should be displayed with respect to the predicted demand.

The disclosure also provides a computer implemented method including receiving a request for information relating to an event occurring during a first time interval from a user, receiving a commodity contract selection request via processor from the user, determining a market associated with the commodity contract via processor, determining at least one supply source associated with the market, determining at least one of (i) the supply source's available capacity of the commodity during the first time interval and (ii) the cost of the commodity from the supply source; and generating a signal for displaying a visualization of at least one of (i) the supply source's available capacity, and (ii) the cost of the commodity from the supply source during the first time interval via processor.

In some implementations, the data regarding the at least one supply source can include at least one of; (i) forecast date, (ii) value date range, and (iii) supply stack data. The supply stack data can include at least one of: (i) a supplier identifier, (ii) a supplier name, (iii) available capacity, (iv) installed capacity and (v) supplier cost. The available capacity of the supply source can be expressed in the visualization as a graphic having a width, wherein the width of the graphic associated with the supply source corresponds to the amount of the supply source's available capacity. The cost of the commodity from the supply source can be expressed in the visualization as a graphic having a height, wherein the height of the graphic associated with the supply source corresponds to the cost of the commodity from the supply source. If desired, the method can further include ordering the at least one supply source in relation to other supply sources based on cost. The method can further include generating a signal for displaying a visualization of information relating to a plurality of supply sources. If desired, the available capacity of the plurality of supply sources can be expressed in the visualization as a graphic having a width, wherein each supplier's capacity can be expressed as a slice of the graphic, wherein the thickness of the slice corresponds to the amount of the supply source's available capacity. The cost of the commodity from the plurality of supply sources can be expressed by the height of the slice corresponding to each supply source, wherein the height of the slice corresponds to the cost of the commodity from the supply source. If desired, the method can further include determining whether a demand marker should be shown on the graphic indicating predicted demand for the commodity associated with the commodity contract during the first time interval. In some implementations, the method can include determining where a demand marker should be shown on the graphic indicating predicted demand for the commodity associated with the commodity contract during the first time interval. If desired, the graphic can be a three-dimensional graphic that shows the available capacity of the plurality of supply sources and the cost of the commodity from the plurality of supply sources over a time period associated with the commodity contract.

It is to be understood that both the foregoing general description and the following detailed description are exemplary and are intended to provide further explanation of the disclosed embodiments. The accompanying drawings, which are incorporated in and constitute part of this specification, are included to illustrate and provide a further understanding of the methods and systems and devices of the present disclosure. Together with the description, the drawings serve to explain the principles of embodiments of the disclosure.

BRIEF DESCRIPTION OF THE FIGURES

The accompanying figures and/or appendices illustrate various exemplary embodiments in accordance with the present disclosure.

DETAILED DESCRIPTION

Introduction

Figure 1:
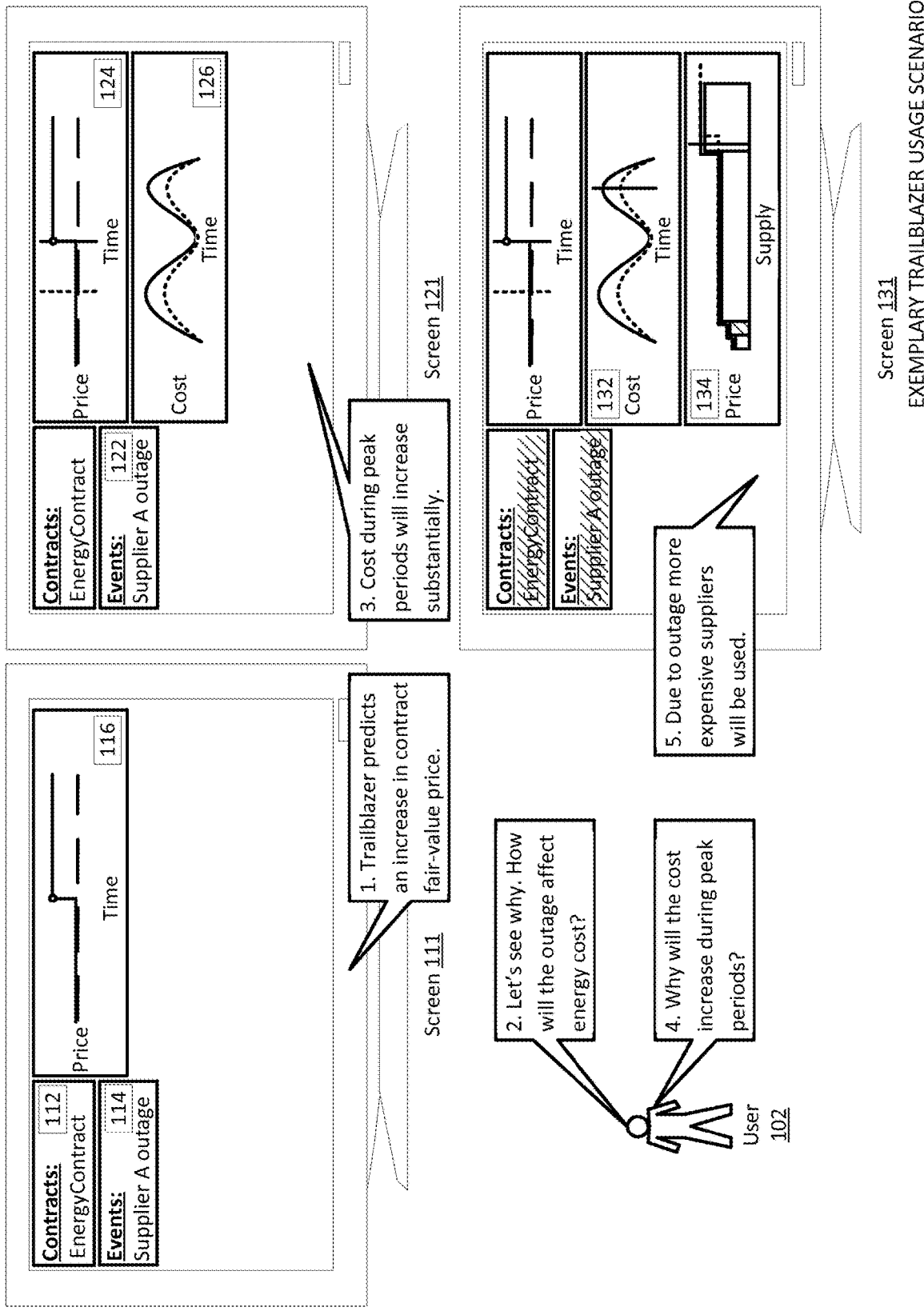
FIG. 1 shows an exemplary usage scenario in one embodiment of the TRAILBLAZER.

In order to describe the TRAILBLAZER in its initial embodiment for electrical power, we first examine some characteristics of wholesale electrical power markets. Other embodiments of the TRAILBLAZER may apply similar concepts to cover further types of commodities and markets.

A feature of the liberalized wholesale electrical power markets is that there are multiple power generating utilities (suppliers) connected to a regional, national and even international interconnected power transmission network or grid.

In supplying power to the grid and since electrical power cannot easily be stored for later use, suppliers play by a set of commercial and operational rules managed by a transmission system operator (TSO), which guarantees an ability to meet demand and ensures a transparent wholesale market pricing mechanism.

As the input energy type for generating electrical power as well as technology, investment and operating profiles differ significantly between generators, it means that some types of generators under normal conditions operate continuously (e.g., nuclear plants) and others can more readily start or wind down production (e.g., oil or gas fired generators) based upon demand. The capacity and marginal production cost of a generator as a result also varies significantly. Typically, plants with a low marginal cost of production, such as nuclear power plants, may have a high investment cost and may be associated with large scale lengthy projects to bring in new capacity. Whereas plants with a high marginal cost of production, such as gas fired plants, may have a smaller upfront investment and may be added more quickly.

A regional grid may connect hundreds or more individual generators of various types and thus generators having varying marginal production cost profiles may contribute supply in order to meet the overall demand. Where a wholesale market is national and with internationally linked TSOs, the number of generators can be in the thousands spanning diverse types of generators and cost profiles.

One feature of the electrical power markets is that the TSO wholesale price is set based upon the generator operating at the highest marginal cost of production used in order to fulfill current demand, this is referred to as the Settlement Price and is also the basis for the TSO settling payment to the generators. This means that the switching between the next higher or lower cost of generation (supply) gives rise to smaller or larger jumps in the wholesale market price.

In one embodiment, the delivery unit of the electrical power markets is measured in hourly units (KWh or MWh), and pricing (e.g., daily price) is set by averaging the highest production costs contributing within each hourly slot of the generating day. Accordingly, suppliers may bid via the TSO to supply for the Day Ahead divided into hour by hour slots. From these bids the TSO assembles the bid stack in increasing order of marginal cost of production and accordingly sets a price per MW during each hourly slot based upon a forecast of Day Ahead demand profile.

As the generating day progresses, one or more generators may be unable to deliver their planned capacity, thus causing the stack to be reordered when bringing online further and potentially more expensive capacity. As demand during the day moves up and down the dynamically changing bid stack, the cost of the last produced MWh changes accordingly. Steps and spikes in the wholesale market price may therefore be a continuously occurring phenomenon in the power and indeed other commodity markets where multiple suppliers are influenced by short-run production cost factors.

Each of the generators may be aware of their own operational characteristics as well as the orders issued by the TSO to either start up, shut down, increase or decrease system capacity as demand on the network changes during the day. The TSO, in turn, may be familiar with and have visibility of the operation of the generators on the TSO's network.

For example, Nord Pool Spot's website may provide further detailed characteristics and rules of electrical power markets.

The exchange traded markets in power contracts are locked into the short-run changes in the Day Ahead hour by hour MWh spot price of the wholesale market. The financial futures contracts which trade Week Ahead, Month Ahead, Quarter Ahead and Year Ahead are based upon the underlying hour by hour Day Ahead spot price of the wholesale market. As an aside, there is also a liquid Over the Counter (OTC) market in electrical power spot and futures contracts with a variety of expiries offered through brokers. The wholesale market utilities themselves play in both markets primarily to hedge their own operations. Traders and investors also participate in the market to hedge or to make profits from their positions. These players may be potential users of the TRAILBLAZER.

In most mature power markets today, the hour-by-hour settlement price is calculated one day in advance. After the price is calculated the exchange may inform the participants (buyers and sellers) whether their bids and offers were accepted or not. The exchange may also inform the TSOs about who is buying and selling electricity that next day. In most markets, these reports are also made publicly available, often with a small delay and typically aggregated and anonymous. Thus, if you are not a TSO, you may not have direct access to the composition of the full supply stack as it evolves during the generating day. The stack may look different from one time to the next. The appearance of the stack could be updated, for example, every one or more minutes (in any desired increment) such as an hour or quarter hour, resulting in smaller or larger jumps in the cost of meeting current demand—this means that the better you understand the current composition of the stack, the more informed you are of what the current wholesale market price should be and thus what the longer term influence on the price of the exchange or OTC traded financial futures contracts may be.

In one embodiment, to be in touch with the price evolution of a commodities market sensitive to short-run changes in supply and demand, the TRAILBLAZER reproduces a real-world structural model of the market's dynamically changing stack of physical suppliers and tracks the real-world and market factors that influence the on-going change in the marginal cost of production of the supply system. Each jump to a higher or lower cost of supply with reference to current demand, as in the electrical power market, may accumulate to influence the delivery price of the futures contracts expiring days, weeks, months, and/or the like ahead.

In one embodiment, the TRAILBLAZER assembles and maintains a comprehensive database of the actual physical production facilities and processes involved in supplying the market (e.g., name, location, technology type, input energy, normal capacity, peak capacity, etc.). In one embodiment, the TRAILBLAZER utilizes the data collection processes to continuously monitor and recalculate data in response to news and data events that impact operational capacity (e.g., scheduled and un-scheduled outages), which many country regulators now require the industry to publish.

In one embodiment, the production cost characteristics of each physical plant are combined with data on the evolving cost of input fuels and carbon credits or the run of rivers, wind speeds, and/or the like as it may apply to the plant in question. In one embodiment, forecasting market price entails forecasting marginal cost of production for each of the possible suppliers in the market as well as forecasting the demand on the system.

In one embodiment, the TRAILBLAZER performs these continuous forecasts of prices, in case of the power market for every hour 2 years out into the future based upon the discrete stack of the physical suppliers, which in the initial implementation covers the Nordic and German power markets.

Detailed Description of the Trailblazer

FIG. 1 shows an exemplary usage scenario in one embodiment of the TRAILBLAZER. In FIG. 1, a user 102 may utilize the TRAILBLAZER to analyze electrical power markets. For example, as shown in screen 111, the user may wish to know the fair-value price for a contract (e.g., Week Ahead exchange traded power contract) predicted by the TRAILBLAZER and how that compares to the market price for the contract. The user may select the contract 112 from a list of contracts. The TRAILBLAZER may show a list of events that caused a change in the fair-value price for the contract, such as an outage at Supplier A 114. The TRAILBLAZER may also show a graph of the fair-value price (solid curve) and market price (dashed curve) for the contract in the timeline view 116. Accordingly, the user may observe that the TRAILBLAZER predicts an increase in the contract's fair-value price.

The user may wish to understand why an outage at Supplier A caused the TRAILBLAZER to predict an increase in the fair-value price for the contract. As shown in screen 121, in one embodiment, the user may select the event of interest. In one implementation, the user may select the event 122 from the list of events in the events view and a corresponding vertical marker (solid line) may be shown in the timeline view 124. In another implementation, the user may select the event from the timeline view (e.g., by selecting a price change marker point) and the corresponding event in the events view may be selected. In another embodiment, the user may select another point of interest (e.g., before the predicted increase in the fair-value price for the contract) on the timeline view and a corresponding vertical marker (dashed line) may be shown in the timeline view. For example, the user may wish to compare the predicted cost of supply before and after the event. The TRAILBLAZER may show the predicted cost of supply before the event (dashed curve) and after the event (solid curve) for the period associated with the contract (e.g., Week Ahead) in the profile view 126. In this case, the user may observe that the TRAILBLAZER predicted an increase in the cost of supply after the event for the period associated with the contract. More specifically, the user may observe that the TRAILBLAZER predicted substantial increases in the cost of supply during peak periods (e.g., periods during which demand and/or supply cost are highest).

The user may wish to understand why an outage at Supplier A caused the TRAILBLAZER to predict substantial increases in the cost of supply during peak periods. As shown in screen 131, in one embodiment, the user may select a time interval associated with one of the peak periods in the profile view 132 and a corresponding vertical marker (solid line) may be shown in the profile view. The TRAILBLAZER may show the supply stack (as bars) for the selected time interval in the market cross view 134. Each bar may represent discrete supply sources and/or groups of supply sources (e.g., regional gas fired power plants treated as a single supply source). The width of a bar may signify supply (production capacity) available from the corresponding supply source at the selected time. The height of a bar may signify the cost associated with the corresponding supply source at the selected time. In one implementation, the bar associated with the supply source that was affected by the selected event may be highlighted (e.g., shaded). In this case, the supply source represented by the second from the left bar was affected by the outage at Supplier A. The TRAILBLAZER may also show total demand at the selected time. In one implementation, a vertical marker (solid line) indicating total demand may be used. Furthermore, the TRAILBLAZER may show an outline (dashed curve) of the composition of the supply stack as it was before the selected event. The user may observe that before the selected event, lower cost suppliers (the three leftmost bars) were predicted to be used to satisfy demand, but after the selected event, a higher cost supplier (the fourth bar from the left) was also predicted to be used to satisfy demand. Accordingly, the user may observe that due to the outage at Supplier A, a more expensive supplier was predicted to be used to satisfy demand during the selected time interval, resulting in a higher predicted cost of supply.

Figure 2:
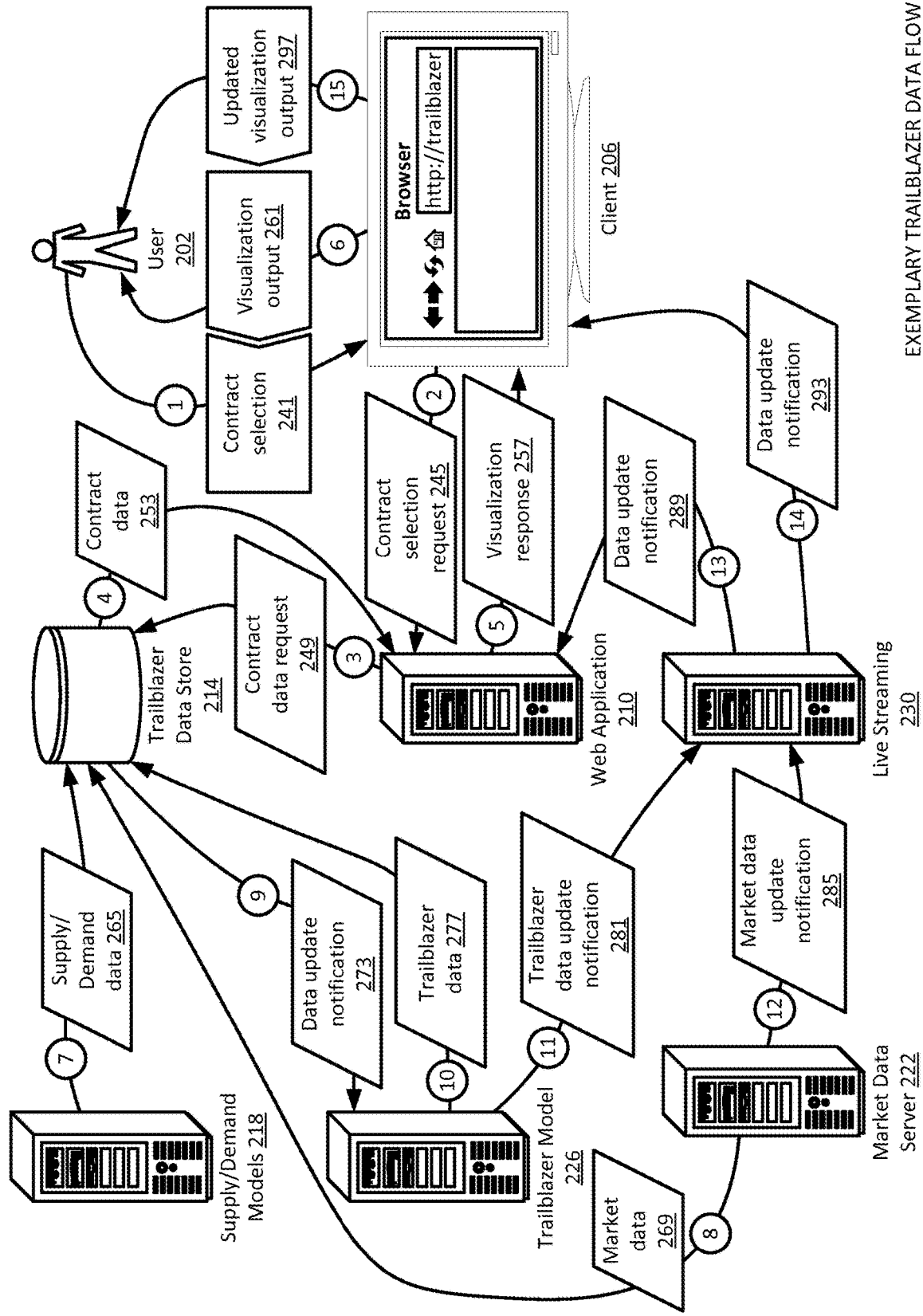
FIG. 2 shows a data flow diagram in one embodiment of the TRAILBLAZER.

FIG. 2 shows a data flow diagram in one embodiment of the TRAILBLAZER. FIG. 2 provides an example of how data may flow to, through, and/or from the TRAILBLAZER. In FIG. 2, a user 202 may provide a contract selection 241 to the user's client 206 (e.g., a desktop, a laptop, a tablet, a smartphone). In one implementation, the user may provide the contract selection via the GUI of the TRAILBLAZER. For example, the user may utilize a peripheral device of the client (e.g., a keyboard, a mouse, a touchscreen) to select a contract, an event associated with a contract, a time interval associated with a contract, a supply source associated with a contract, and/or the like.

The client may send a contract selection request 245 to a web application 210. For example the contract selection request may include data such an identifier of the selected contract, an identifier of the selected event, time interval selection, an identifier of the selected supply source, an indicator of visualization requested by the user (e.g., display curve of predicted fair-value price for the contract, display curve of predicted cost of supply for the period associated with the contract, display a graph of the supply stack as of the time interval, display information regarding the supply source), and/or the like.

The web application may send a contract data request 249 to a TRAILBLAZER data store 214. For example, the contract data request may instruct the TRAILBLAZER data store to provide data utilized by the web application to generate visualizations.

The TRAILBLAZER data store may send contract data 253 to the web application. For example, the contract data may include commodity prices data, contract prices data, demand data, supply stack data, events data, and/or the like.

The web application may send a visualization response 257 to the client. For example, the visualization response may be a rendering of the requested visualization (e.g., updated contract overview view, updated events view, updated timeline view, updated profile view, updated market cross view) to be displayed by the client (e.g., via a web browser).

The client may output a visualization to the user at 261. For example, the client may output a TRAILBLAZER page via a web browser that includes the requested visualization. In another example, the client may output a TRAILBLAZER page via a mobile app that includes the requested visualization.

If the underlying supply and/or demand data utilized to calculate predicted values changes, supply and/or demand models 218 may send updated supply and/or demand data 265 to the TRAILBLAZER data store. If the underlying market data utilized to calculate predicted values changes, market data server 222 may send updated market data 269 to the TRAILBLAZER data store.

The TRAILBLAZER data store may send a data update notification 273 to a TRAILBLAZER model 226. For example, the data update notification may inform the TRAILBLAZER model that underlying data utilized to calculate predicted values was updated. The TRAILBLAZER model may recalculate affected predicted values and may send such updated TRAILBLAZER data 277 to the TRAILBLAZER data store.

If TRAILBLAZER data was updated, the TRAILBLAZER model may send a TRAILBLAZER data update notification 281 to live streaming 230. If market data was updated (e.g., tick-level update), the market data server may send a market data update notification 285 to live streaming.

Live streaming may send a data update notification 289 to the web application. For example, the data update notification may inform the web application that data should be updated (e.g., by retrieving updated data from the TRAILBLAZER data store).

Live streaming may send a data update notification 293 to the client (e.g., via a browser). For example, the data update notification may inform the client that the visualization should be updated (e.g., the client should obtain updated data from the web application and update the visualization).

The client may output an updated visualization 297 to the user. In one implementation, the client may utilize a web browser, a mobile app, and/or the like to facilitate (e.g., real-time) delivery of updates without having to refresh the entire page. For example, technologies such AJAX, WebSocket Protocol, and/or the like may be utilized.

Figure 3A:
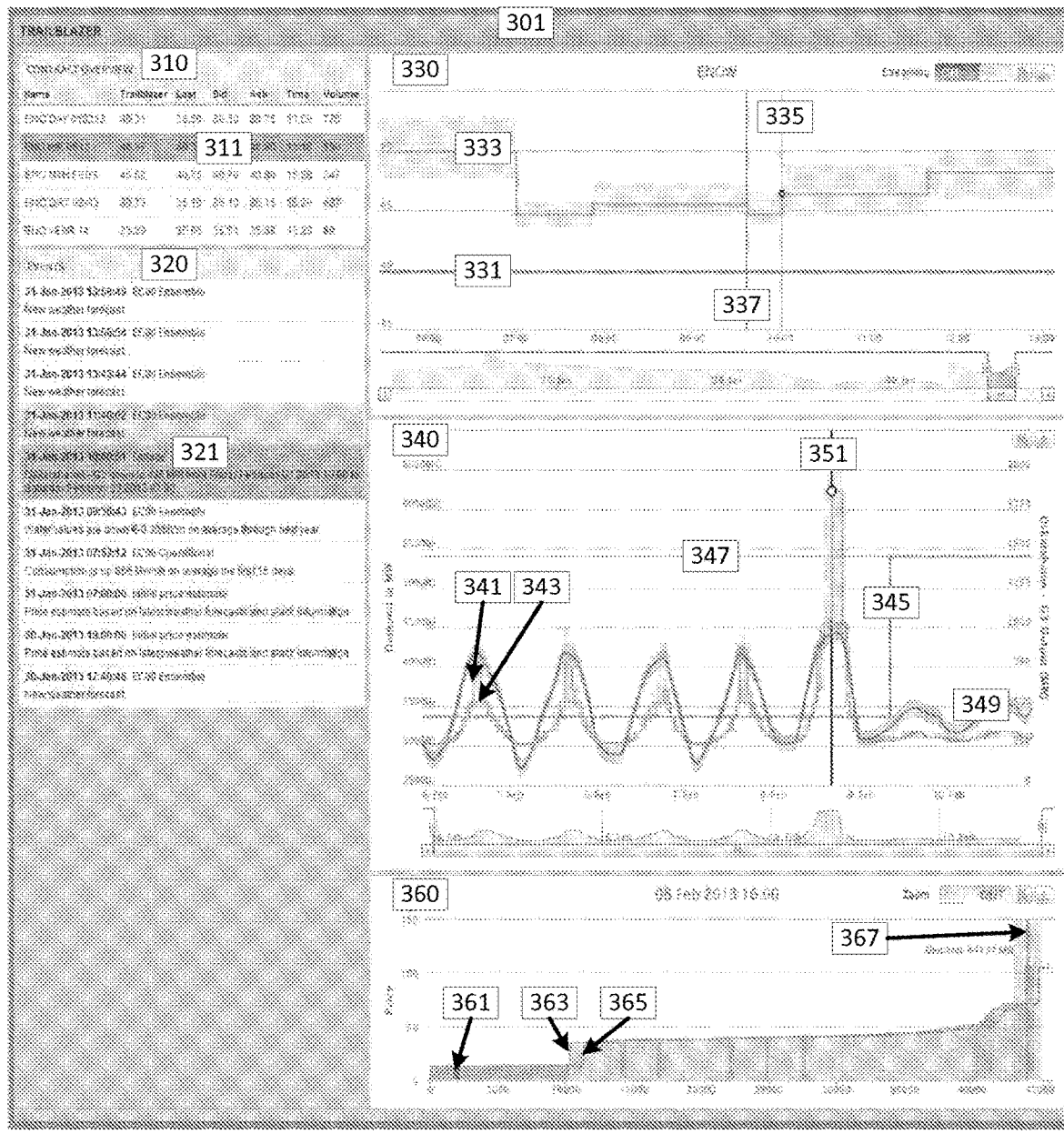
FIG. 3A shows a screen shot diagram illustrating a TRAILBLAZER visualization in one embodiment of the TRAILBLAZER.

FIG. 3A shows a screen shot diagram illustrating a TRAILBLAZER visualization in one embodiment of the TRAILBLAZER. In FIG. 3A, a visualization 301 that may be generated by the TRAILBLAZER for a user in the course of a commodity (e.g., electrical power) market analysis is shown.

The contract overview view 310 shows a list of contracts that may be analyzed by the user. In one embodiment, contracts listed in the contract overview view may be filtered based on a market (e.g., Nordic) and/or based on a commodity (e.g., electrical power). Information such as the name of the contract, the predicted fair-value price, the last traded price, the bid price, the ask price, the time of the last trade, the volume of trades, and/or the like may be shown for each contract. The user may select a contract (e.g., Week Ahead exchange traded power contract) 311 to analyze. In one implementation, the user may click on the contract using a mouse to select the contract. The selected contract may be highlighted to indicate that it was selected.

Events that caused a change in the predicted fair-value price for the selected contract may be displayed in the events view 320. In one embodiment, such events may include plant outages, weather changes, transmission capacity adjustments, causes giving rise to an increase or decrease in demand, and/or the like. In one implementation, events in the events view may be sorted (e.g., chronologically with most recent event on top). Information such as the date and/or time when the event occurred and/or was handled (e.g., a new estimate was made) by the TRAILBLAZER, the type of the event (e.g., supplier outage, fuel price update, demand forecast update, new weather forecast), description of the event and/or a link to additional details regarding the event, the predicted fair-value price of the selected contract after the event, and/or the like may be shown for each event. For example, information regarding such events may be retrieved from the event texts data store 1130g via one or more SQL queries, RPCs, and/or the like. In one implementation, data stored in the event texts data store may include: contract identifier (e.g., an identifier of the contract, such as "ENO;M;main" (Nordic electric power market, Monthly contract, main price estimate), that specifies the market, the type of contract (e.g., daily, weekly, monthly, quarterly, yearly), and whether the value is a main, high or low price estimate; forecast date (e.g., the timestamp when the estimate was made); value date (e.g., a value, such as "01.11.2013 00:00" (identifies Monthly November 2013 contract), that identifies the precise contract); event text (e.g., the text associated with the event, which may be displayed in the contract overview view). In one implementation, if the user hovers over an event, the TRAILBLAZER may show a corresponding (e.g., vertical) marker in the timeline view. In one implementation, if the user selects (e.g., clicks on) an event (e.g., an outage at a supplier) 321, the TRAILBLAZER may show a corresponding (e.g., vertical) marker (e.g., 335) in the timeline view and/or update at least one of the timeline view, the profile view, and the market cross view to show changes caused by the selected event.

The timeline view 330 shows a graph of the market price 331 (e.g., real-time quoted market price) and/or of the fair-value price 333 for the selected contract. See FIG. 5 for additional details regarding calculating a fair-value price. In one embodiment, an uncertainty band (shaded area around curve 333) associated with the fair-value price may be shown. The uncertainty band represents the price risk range associated with a jump to a supply source with a higher and/or a lower production cost for the commodity. In one implementation, the range of the uncertainty band may be defined in terms of a shift in demand (e.g., a 1,000 MW increase or decrease in demand, a user-defined range). In another implementation, the range of the uncertainty band may be defined in terms of a shift across supply stack (e.g., a shift to the next lower or higher cost supplier). The market price, the fair-value price, and/or the uncertainty band may be updated based on real-time quoted market price updates and/or events causing the TRAILBLAZER to change the fair-value price. See FIG. 6 for additional details regarding generating a visualization of market and fair-value prices.

Marker points on the curve of the fair-value price signify times when events causing the TRAILBLAZER to change the fair-value price have been handled. In one embodiment, the user may select one or more marker points for analysis. For example, selecting two neighboring marker points facilitates a before and after analysis of the effect of an event in the profile view and/or market cross view. In one implementation, if the user selects a marker point, a corresponding (e.g., vertical) marker 335 may be shown in the timeline view and/or a corresponding event 321 may be highlighted in the events view. In another implementation, if the user selects another (e.g., a second) marker point, another corresponding (e.g., vertical) marker 337 may be shown in the timeline view and/or another corresponding event may be highlighted in the events view. The profile view and/or the market cross view may be updated based on marker points selected by the user to facilitate analysis of the effect of the selected events.

If the user selects an event of interest (e.g., by selecting the event at 321 in the events view, by selecting the event at 335 in the timeline view), the profile view 340 may show a curve of the predicted cost (e.g., marginal production cost) of supply 341 for the period associated with the contract (e.g., Week Ahead) that takes into account the effect of the event. If the user selects another event of interest, the profile view may show a curve of the predicted cost of supply 343 for the period associated with the contract that takes into account the effect of the other event (e.g., the predicted cost of supply before the first event). See FIG. 4 for additional details regarding calculating cost of supply. In one embodiment, an uncertainty band (shaded area around curves 341, 343) associated with the predicted cost of supply may be shown for each curve. For example, curve 343 may show the predicted cost of supply before the outage and curve 341 may show the predicted cost of supply after the outage during the seven day period associated with the contract. See FIG. 7 for additional details regarding generating a visualization of cost of supply.

If the user selects a supply source (e.g., a supplier by clicking on the corresponding bar in the supply stack) from the market cross view, the profile view may show available capacity from the supply source. If the user selected an event of interest, a curve of the available capacity 345 for the period associated with the contract that takes into account the effect of the event may be shown. If the user selected another event of interest, a curve of the available capacity 347 for the period associated with the contract that takes into account the effect of the other event (e.g., the available capacity before the first event) may be shown. For example, curve 347 may show the available capacity before the outage and curve 345 may show the available capacity after the outage during the seven day period associated with the contract. See FIG. 8 for additional details regarding generating a visualization of available capacity.

If the user wishes, the predicted demand curve 349 for the period associated with the contract may be shown in the profile view. In one implementation, the user may click on the demand marker in the market cross view to indicate that the user wishes to view the predicted demand curve in the profile view. In one embodiment, an uncertainty band (shaded area around curve 349) associated with the predicted demand may be shown. Displaying the predicted demand curve may facilitate comparison of the predicted demand to the predicted cost of supply to aid the user's analysis. For example, the user may observe that during the outage shown by available capacity curves 345, 347, the differences between the two predicted cost of supply curves 341, 343 are most pronounced during periods of peak demand shown by the predicted demand curve 349. See FIG. 9 for additional details regarding generating a visualization of demand.

If the user selects (e.g., by clicking on a point in the profile view) a time interval (e.g., the selected hour during one of the days associated with the contract) in the profile view, a corresponding (e.g., vertical) marker 351 may be shown in the profile view. The market cross view may be updated based on the time interval selected by the user to facilitate analysis of supply and demand for the commodity during the selected time interval.

The market cross view 360 may show the supply stack (e.g., as bars) representing alternative sources of supply for the commodity during the selected time interval. The supply stack may be shown taking into account the effect of the selected event. In one embodiment, each bar may represent a supply source (e.g., a gas fired power plant) and/or groups of supply sources having a similar cost profile (e.g., regional gas fired power plants treated as a single supply source). The width of a bar may signify supply (e.g., production capacity) available from the corresponding supply source during the selected time interval. The height of a bar may signify the cost associated with the corresponding supply source during the selected time interval. Bars in the supply stack may be ordered by cost. In one implementation, if the user hovers over a bar, the identity of the corresponding supplier, production capacity of the supplier, the cost associated with the supplier, and/or the like may be shown (e.g., in a popup) in the market cross view. In one implementation, if the user clicks on a bar, available capacity from the corresponding supply source may be shown in the profile view. If the user selected another event of interest, available capacity from the corresponding supply source that takes into account the effect of the other event (e.g., the available capacity before the first event) may be shown in the profile view. In one implementation, the bar 361 associated with the supply source that was affected by the selected event 321 may be highlighted (e.g., shaded).

In one embodiment, an outline of the composition of the supply stack 363 may be shown in the market cross view. If the user selected another event of interest, an outline of the composition of the supply stack that takes into account the effect of the other event (e.g., the outline of the composition of the supply stack before the first event) 365 may be shown in the market cross view. Displaying outlines of the composition of the supply stack may facilitate understanding the reason for changes in the predicted cost of supply, which may impact the predicted fair-value price of the selected contract. For example, the user may observe that due to the outage, more expensive suppliers were predicted to be used to satisfy demand during the selected time interval, resulting in a higher predicted cost of supply.

In one embodiment, a (e.g., vertical) demand marker 367 may be shown in the market cross view. The demand marker may show predicted demand for the commodity during the selected time interval. For example, text specifying predicted demand (e.g., "Demand: 44137 MW") may be displayed for the demand marker. In one implementation, an uncertainty band (shaded area around marker 367) associated with the predicted demand may be shown. In one implementation, the user may click on the demand marker to indicate that the user wishes to view the predicted demand curve for the period associated with the contract in the profile view. See FIG. 10 for additional details regarding generating a visualization of supply sources and demand marker.

Figure 3B:
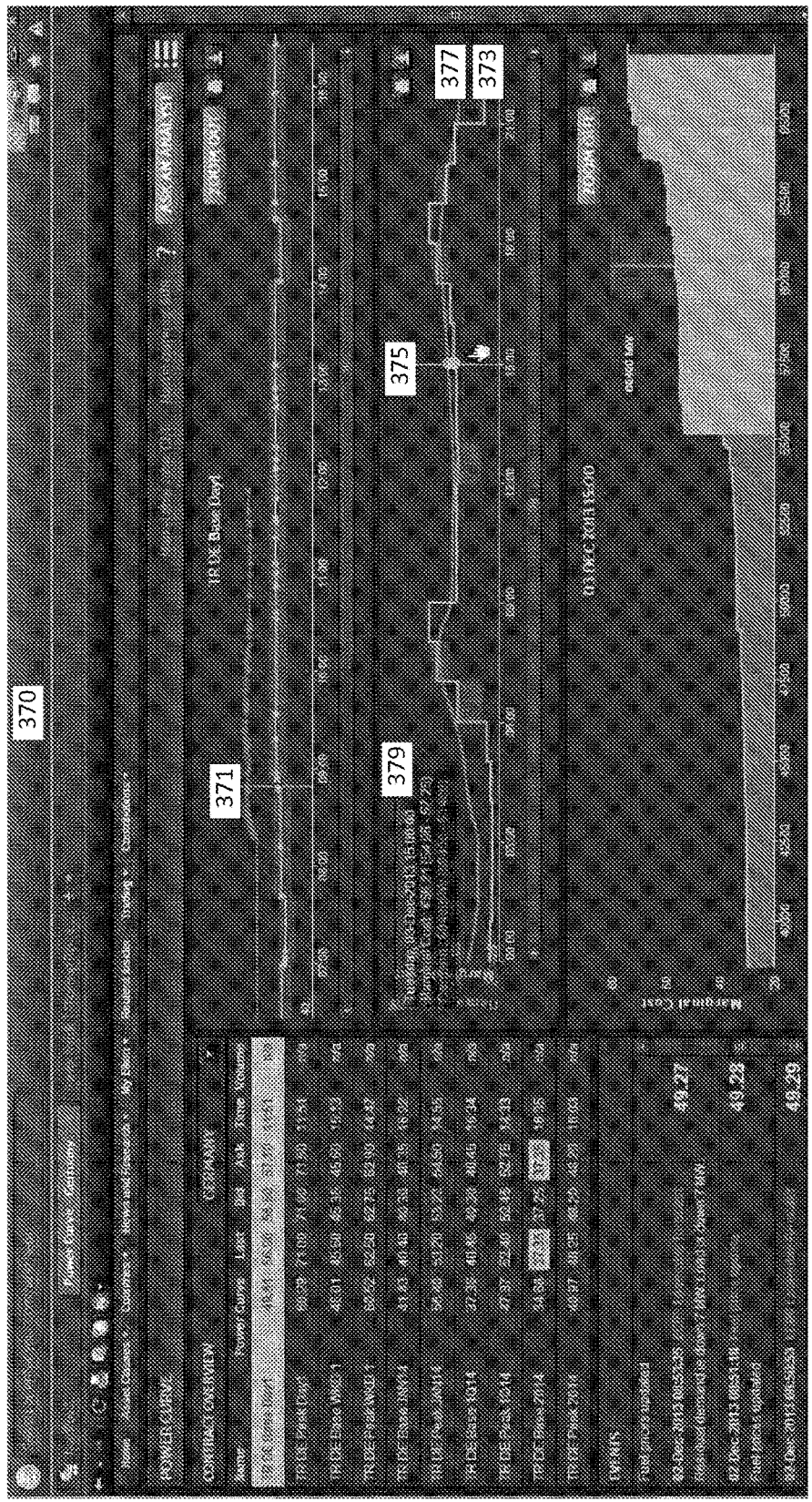
FIG. 3B shows a screen shot diagram illustrating a TRAILBLAZER visualization in one embodiment of the TRAILBLAZER.

FIG. 3B shows a screen shot diagram illustrating a TRAILBLAZER visualization in one embodiment of the TRAILBLAZER. In FIG. 3B, an alternative embodiment of a visualization 370 that may be generated by the TRAILBLAZER for a user in the course of a commodity (e.g., electrical power) market analysis is shown. For example, such a visualization may be generated for a user utilizing a desktop, a laptop, and/or the like.

In this embodiment, the user selected a single marker point on the curve of the fair-value price for analysis, as indicated by marker 371. Accordingly, a single curve of the predicted cost of supply 373 may be shown in the profile view. The user also selected a time interval in the profile view, as indicated by marker 375, and indicated that the user wishes to view the predicted demand curve. Accordingly, the market cross view may be updated based on the selected time interval, and the predicted demand curve 377 may be shown in the profile view.

In one implementation, if the user hovers over the marker 375, information regarding the time interval selected by the user, the predicted cost of supply (e.g., including the uncertainty band) during the selected time interval, the predicted demand (e.g., including the uncertainty band) during the selected time interval, and/or the like may be shown in a popup 379.

Figure 3C:
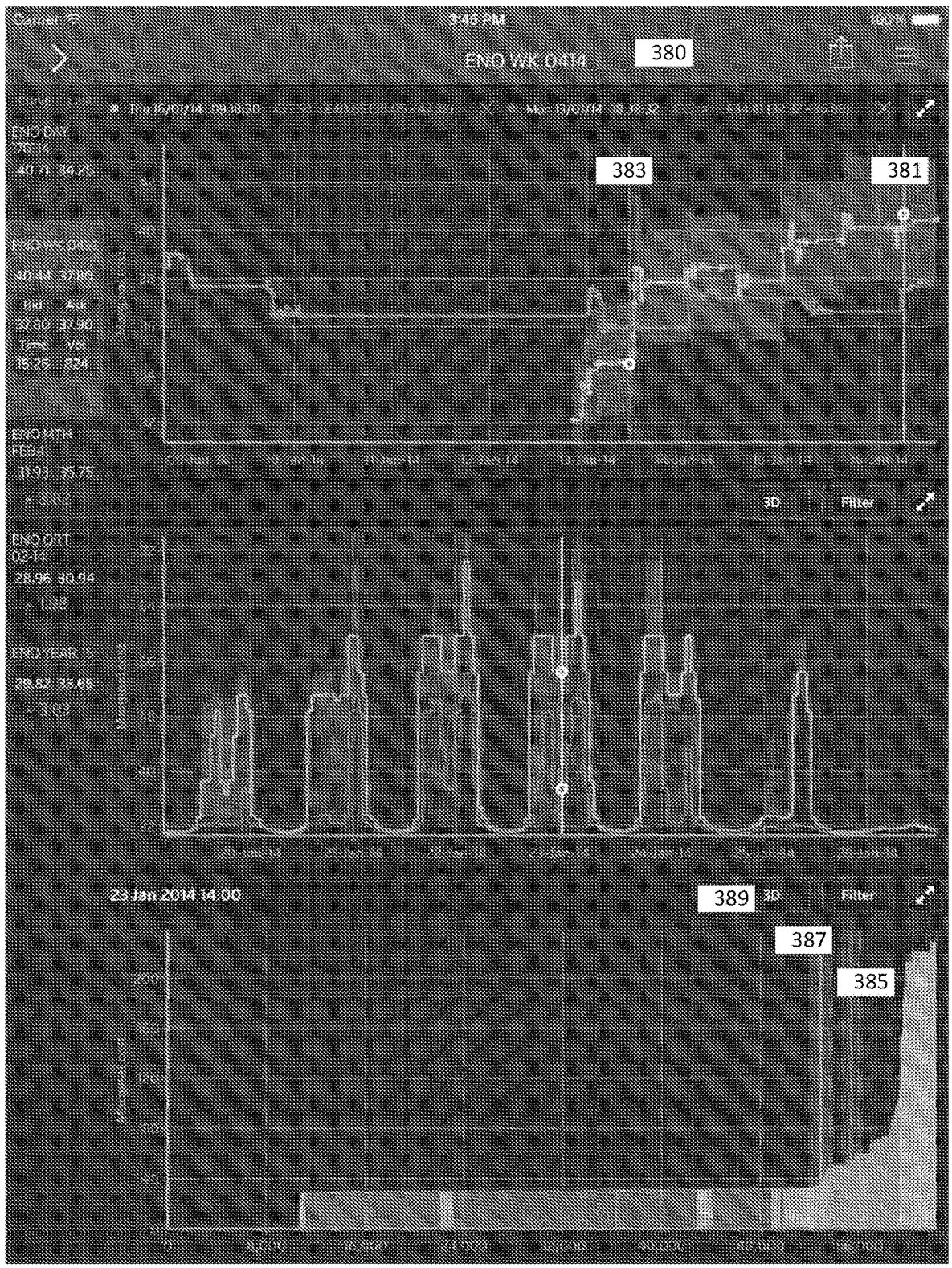
FIG. 3C shows a screen shot diagram illustrating a TRAILBLAZER visualization in one embodiment of the TRAILBLAZER.
Figure 3:
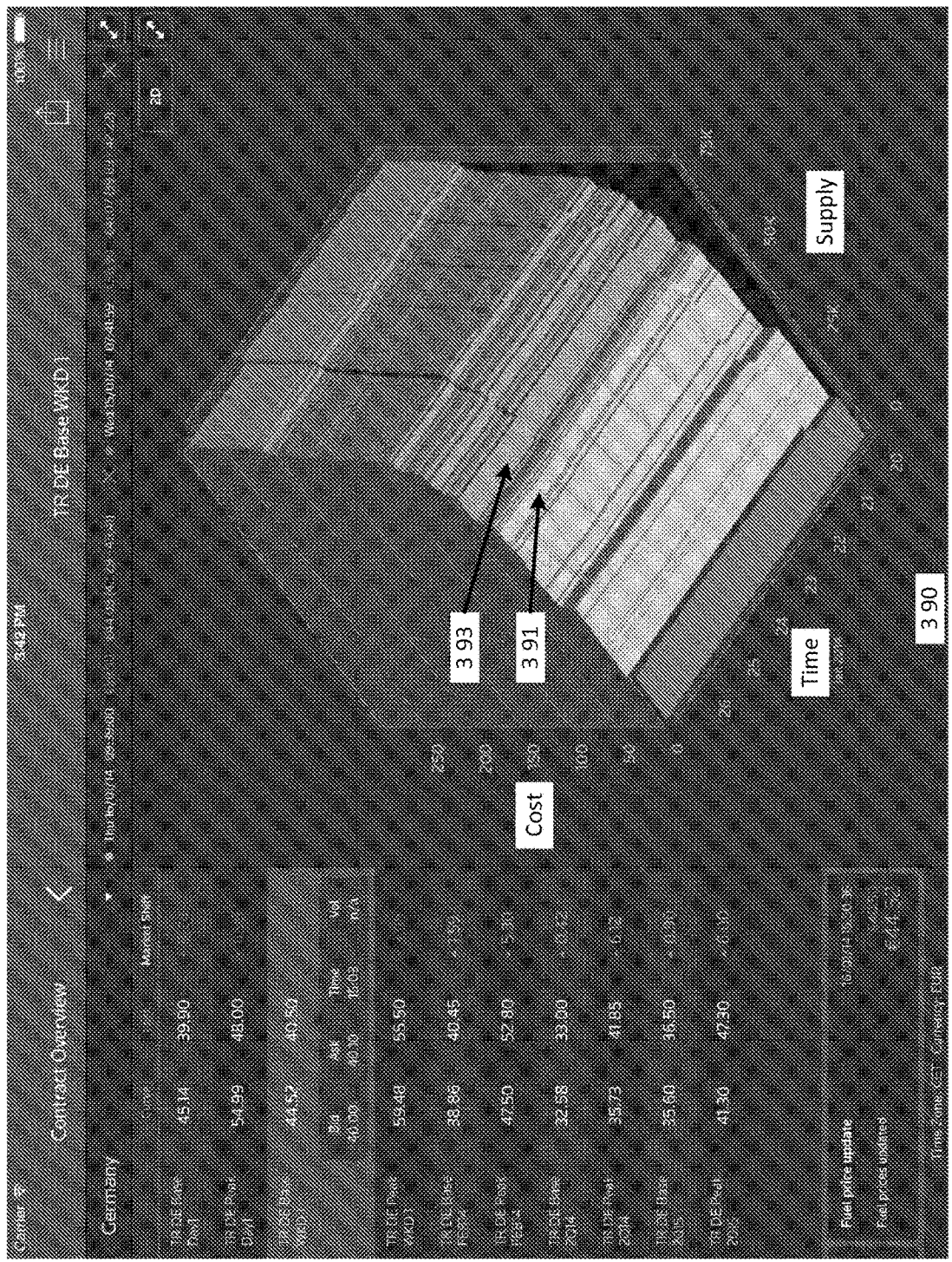
FIG. 3D shows a screen shot diagram illustrating a TRAILBLAZER visualization in one embodiment of the TRAILBLAZER.

FIG. 3C shows a screen shot diagram illustrating a TRAILBLAZER visualization in one embodiment of the TRAILBLAZER. In FIG. 3C, an alternative embodiment of a visualization 380 that may be generated by the TRAILBLAZER for a user in the course of a commodity (e.g., electrical power) market analysis is shown. For example, such a visualization may be generated for a user utilizing a mobile device (e.g., a tablet, a smartphone).

In this embodiment, the user selected two event marker points on the curve of the fair-value price for analysis, as indicated by event markers 381, 383. In this case, the change in the predicted cost of supply was due to a change in demand for the commodity. Accordingly, two demand markers 385 and 387, corresponding to event markers 381 and 383, respectively, may be shown in the market cross view. In one implementation, the user may click on the "3D" GUI widget 389 to indicate that the user wishes to see a three-dimensional visualization of the supply stack and/or demand.

FIG. 3D shows a screen shot diagram illustrating a TRAILBLAZER visualization in one embodiment of the TRAILBLAZER. In FIG. 3D, an alternative embodiment of the market cross view 390 is shown. In this embodiment, a three-dimensional visualization of the supply stack and/or demand is utilized. In one implementation, this embodiment may be used to show how production capacity (supply) and/or cost change over time. In one implementation, this embodiment may be used to show how demand changes over time. Demand curves 391, 393 may show predicted demand as of two different points in time (e.g., selected in the timeline view by the user). For example, such a three-dimensional visualization of the composition of the supply stack and/or demand may be used to facilitate understanding the reasons for changes in the predicted cost of supply.

Figure 4:
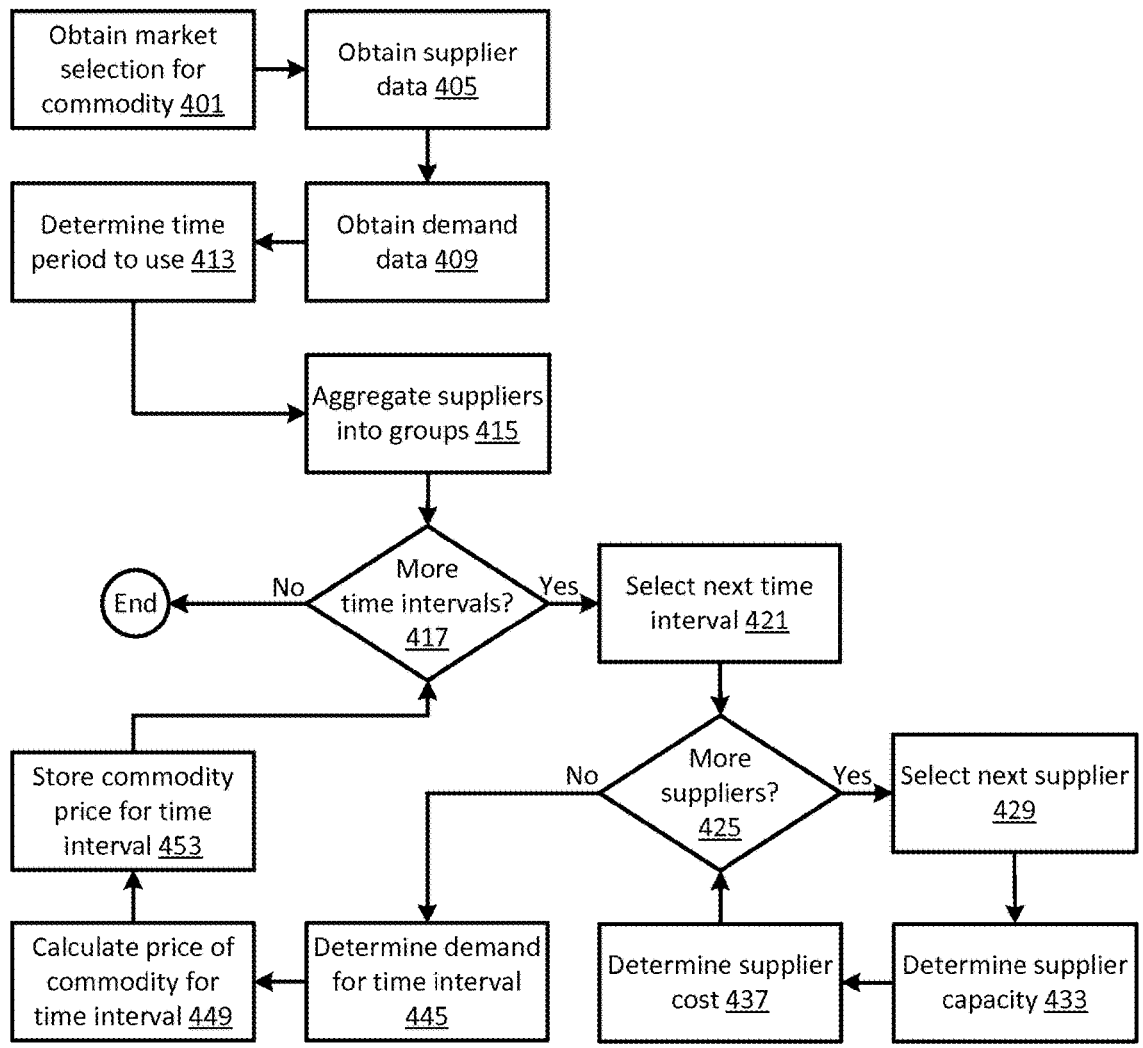
FIG. 4 shows a logic flow diagram illustrating a commodity price calculating (CYPC) component in one embodiment of the TRAILBLAZER.

FIG. 4 shows a logic flow diagram illustrating a commodity price calculating (CYPC) component in one embodiment of the TRAILBLAZER. In FIG. 4, a market selection (e.g., Nordic) for a commodity (e.g., electrical power) may be obtained at 401. For example, a market for which commodity price (predicted cost of supply) should be calculated may be specified in a data store (e.g., a configuration file, a database). In another example, commodity price may be calculated for a market if the TRAILBLAZER learns of an event (e.g., supplier outage, fuel price update, demand forecast update, new weather forecast) that may affect commodity price for the market.

Supplier data for the selected market may be obtained at 405. For example, supplier data may include a list of suppliers associated with the selected market and information such as fuel type, cost (e.g., based on fuel price, based on weather), geographic location, installed capacity, outages, and/or the like for each supplier. In one implementation, supplier data may be obtained from a data store via one or more SQL queries, RPCs, and/or the like.

Demand data for the selected market may be obtained at 409. For example, demand data may include commodity demand information for the market, for different price areas within the market, and/or the like. In one implementation, demand data may be obtained from a data store via one or more SQL queries, RPCs, and/or the like.

Time period for which to calculate commodity price may be determined at 413. For example, the time period may be specified in a data store (e.g., a configuration file, a database). In one implementation, the time period may be specified directly (e.g., calculate commodity price during the next two years). In another implementation, the time period may be specified in terms of another parameter (e.g., calculate commodity price until the end of the front year futures contract—a time period of between one and two years).

Suppliers may be aggregated into groups at 415. In one embodiment, suppliers may be aggregated into a predetermined number of groups (e.g., 100groups, 200 groups) to facilitate generating a visualization of the supply stack (e.g., to avoid generating too many bars in the market cross view). For example, supply sources having a similar cost profile may be aggregated into a group.

A determination may be made at 417 whether there are more time intervals for which to calculate commodity price.

In one embodiment, the length of a time interval may depend on market conventions (e.g., one hour, 30 minutes). For example, since the delivery unit of the Nordic electrical power market is measured in hourly units, the length of the time interval may be one hour. Accordingly, commodity price may be calculated for each time interval (e.g., hour) of the specified time period (e.g., the next two years).

If there are more time intervals for which to calculate commodity price, the next time interval may be selected for analysis at 421. A determination may be made at 425 whether there are more suppliers to analyze for the selected time interval. If so, the next supplier may be selected for analysis at 429. The supplier's available capacity during the selected time interval may be determined at 433. In one implementation, the supplier's available capacity may be determined based on supplier data (e.g., installed capacity minus capacity unavailable due to outages). The supplier's cost during the selected time interval may be determined at 437. In one implementation, the supplier's cost may be determined based on supplier data (e.g., based on market data, based on gas price for a gas fired power plant, based on wind data for a wind turbine power supplier).

Demand for the selected time interval may be determined at 445. In one implementation, demand for the commodity may be determined based on demand data (e.g., demand forecast for the selected time interval may be obtained). For example, demand data may be retrieved from the demand data store 1130e via one or more SQL queries, RPCs, and/or the like. In one implementation, data stored in the demand data store may include: estimate identifier (e.g., an identifier of the estimate, such as "ENO;main" (Nordic electrical power market, main demand estimate), that specifies the market and whether the value is a main, high or low demand estimate; forecast date (e.g., the timestamp when the estimate was made); value date (e.g., the time interval associated with the estimate); value (e.g., forecasted demand for the estimate).

Commodity price for the selected time interval may be calculated at 449. In one embodiment, commodity price may be calculated based on the intersection point between the supply curve (e.g., based on the physical stack that includes data regarding available capacity and cost) and the demand curve (e.g., the level of demand during the selected time interval). For example, commodity price may be based on the cost of the most expensive supplier used in order to fulfill the demand during the time interval. In another example, commodity price may be based on the average of costs of suppliers used in order to fulfill the demand during the time interval. In one implementation, the market may have different price areas, and prices may be calculated for each price area and then for the market as a whole (e.g., taking into account exchanges between different price areas). In another embodiment, commodity price may be calculated for alternative values of demand (e.g., to calculate upper bound (high) and lower bound (low) commodity prices for an uncertainty band).

The calculated commodity price for the selected time interval may be stored at 453. For example, the calculated commodity price may be stored in the commodity prices data store 1130d. In one implementation, data stored in the commodity prices data store may include: estimate identifier (e.g., an identifier of the estimate, such as "ENO;main" (Nordic electrical power market, main price estimate), that specifies the market and whether the value is a main, high or low price estimate; forecast date (e.g., the timestamp when the estimate was made); value date (e.g., the time interval associated with the estimate); value (e.g., the calculated commodity price for the estimate).

Figure 5:
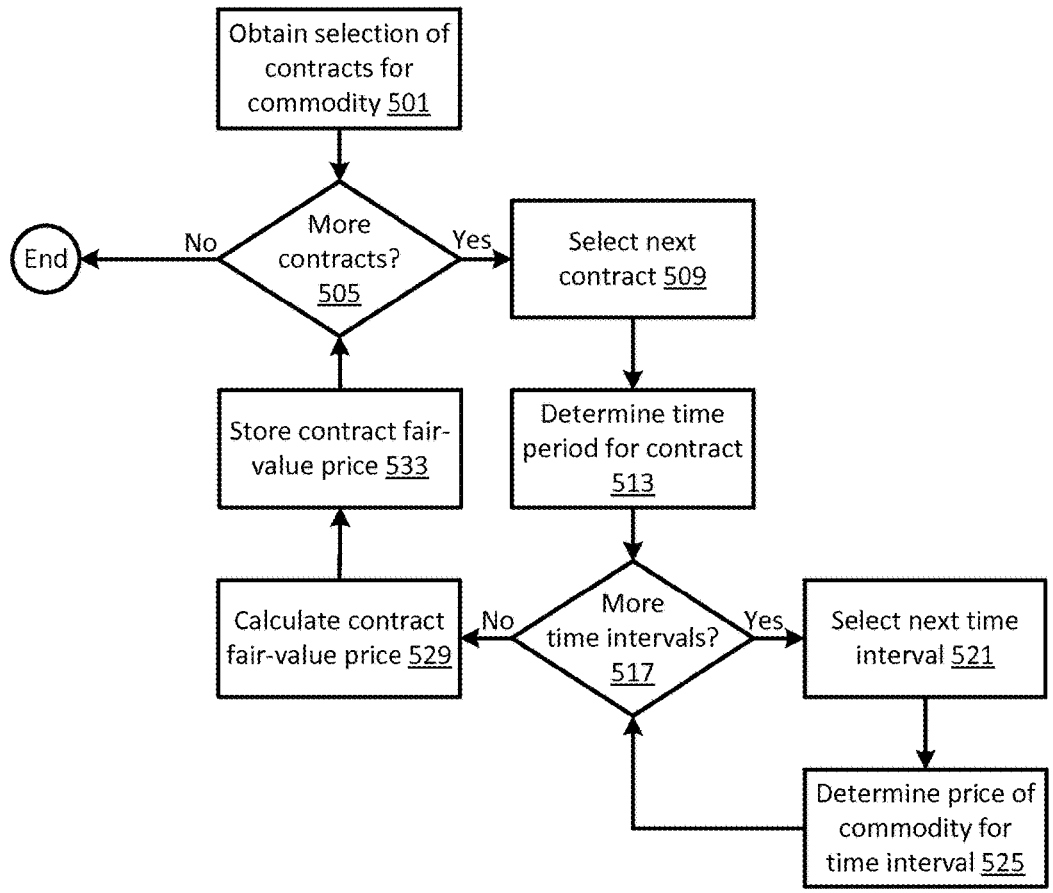
FIG. 5 shows a logic flow diagram illustrating a contract price calculating (CTPC) component in one embodiment of the TRAILBLAZER.

FIG. 5 shows a logic flow diagram illustrating a contract price calculating (CTPC) component in one embodiment of the TRAILBLAZER. In FIG. 5, a selection of contracts (e.g., Day Ahead, Week Ahead, Month Ahead, Quarter Ahead, Year Ahead) for a commodity may be obtained at 501. For example, contracts for which a fair-value price should be calculated may be specified in a data store (e.g., a configuration file, a database). In another example, fair-value price may be calculated for a contract if the TRAILBLAZER recalculated commodity price for the commodity associated with the contract during the time period for that contract.

A determination may be made at 505 whether there are more contracts for which to calculate a fair-value price. If so, the next contract may be selected for analysis at 509. The time period associated with the selected contract may be determined at 513. For example, the time period for a Week Ahead contract may be the week ahead. In another example, the time period for a Month Ahead contract that deals with peak hours (e.g., 8 am to 8 pm) may be the peak hours during the month ahead.

A determination may be made at 517 whether there are more time intervals to analyze. For example, for the Week Ahead contract, each time interval (e.g., hourly) during the time period (e.g., week ahead) for that contract may be analyzed. In another example, for the Month Ahead contract that deals with peak hours, each time interval (e.g., hourly) during the time period (e.g., peak hours during the month ahead) for that contract may be analyzed.

If there are more time intervals to analyze, the next time interval may be selected at 521, and the commodity price for the selected time interval for the commodity associated with the contract may be determined at 525. For example, the commodity price may be retrieved from the commodity prices data store 1130d via one or more SQL queries, RPCs, and/or the like.

A fair-value price for the contract may be calculated at 529. In one embodiment, the fair-value price may be calculated based on an average of the commodity prices for the analyzed time intervals. For example, for the Week Ahead contract, the fair-value price may be based on an average of the commodity prices for each time interval (e.g., hourly) during the time period (e.g., week ahead) for that contract. In another example, for the Month Ahead contract that deals with peak hours, the fair-value price may be based on an average of the commodity prices for each time interval (e.g., hourly) during the time period (e.g., peak hours during the month ahead) for that contract. In another embodiment, the fair-value price may be calculated based on alternative commodity price values (e.g., to calculate upper bound and lower bound fair-value prices for an uncertainty band).

The calculated fair-value price for the contract may be stored at 533. For example, the calculated fair-value price may be stored in the contract prices data store 1130c. In one implementation, data stored in the contract prices data store may include: contract identifier (e.g., an identifier of the contract, such as "ENO;M;main" (Nordic electric power market, Monthly contract, main price estimate), that specifies the market, the type of contract (e.g., daily, weekly, monthly, quarterly, yearly), and whether the value is a main, high or low price estimate; forecast date (e.g., the timestamp when the estimate was made); value date (e.g., a value, such as "01.11.2013 00:00" (identifies Monthly November 2013 contract), that identifies the precise contract); value (e.g., the calculated fair-value price for the estimate).

Figure 6:
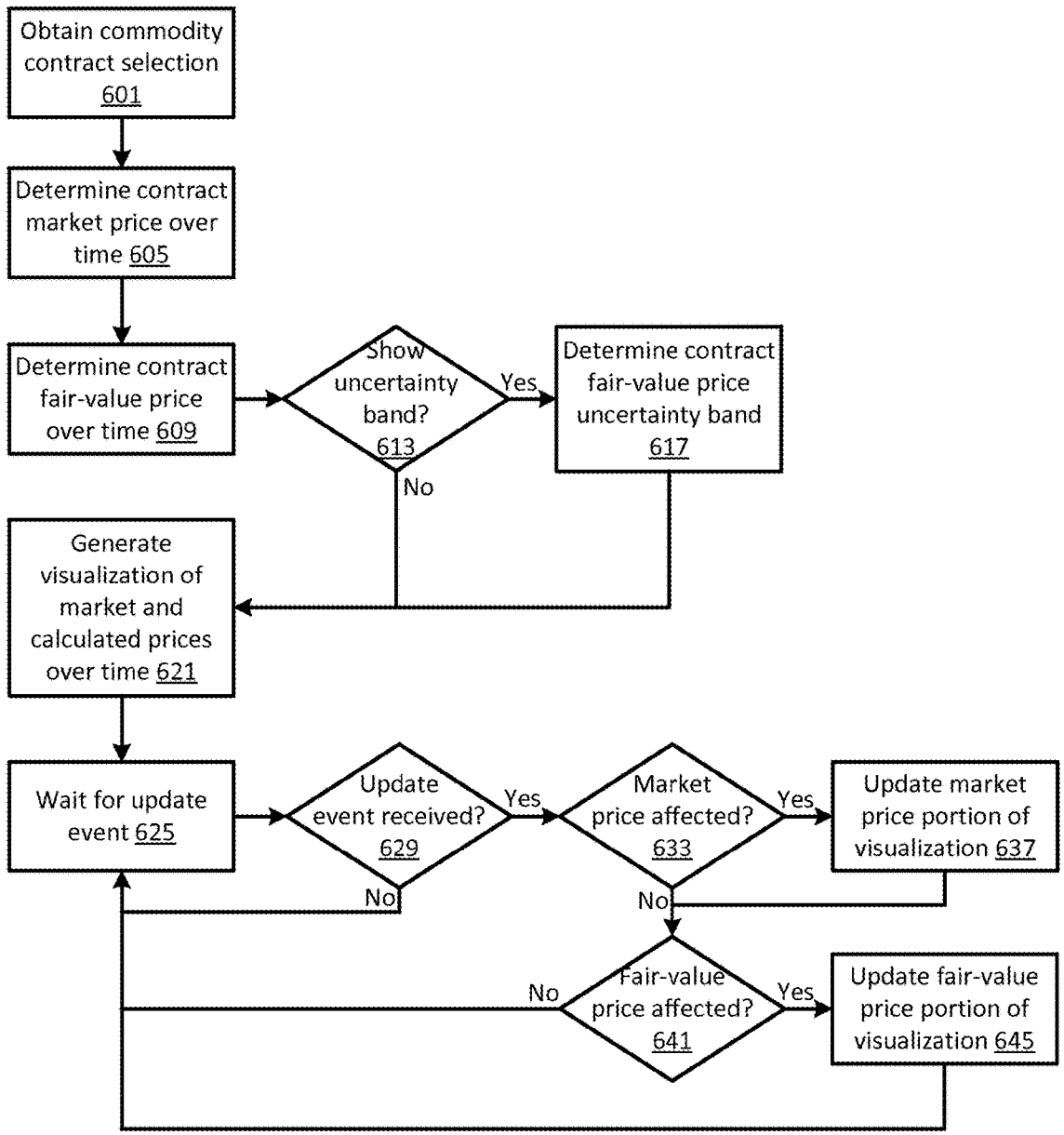
FIG. 6 shows a logic flow diagram illustrating a contract price visualizing (CTPV) component in one embodiment of the TRAILBLAZER.

FIG. 6 shows a logic flow diagram illustrating a contract price visualizing (CTPV) component in one embodiment of the TRAILBLAZER. In FIG. 6, a contract selection may be obtained at 601. For example, a commodity contract may be selected by a user (e.g., in the contract overview view) and the identifier of the selected contract may be obtained.

Market price of the selected contract over time may be determined at 605. In one implementation, the period of time for which the market price is determined may be predetermined (e.g., determine market price for the current day between market opening time and current time). In another implementation, the period of time for which the market price is determined may be specified by the user (e.g., the zoom level set by the user in the timeline view may determine the period of time). For example, the contract's market price may be retrieved from the contract prices data store 1130c via one or more SQL queries, RPCs, and/or the like.

Predicted fair-value price of the selected contract over time may be determined at 609. In one implementation, the period of time for which the predicted fair-value price is determined may be predetermined (e.g., the same period of time as for the market price). In another implementation, the period of time for which the market price is determined may be specified by the user. For example, the contract's predicted fair-value price may be retrieved from the contract prices data store 1130c via one or more SQL queries, RPCs, and/or the like.

A determination may be made at 613 whether an uncertainty band for the fair-value price should be shown (e.g., based on the value of the corresponding configuration option). If so, the upper bound and lower bound fair-value prices for the uncertainty band associated with the contract's fair-value price may be determined at 617. For example, the upper bound and lower bound fair-value prices for the uncertainty band associated with the contract's fair-value price may be retrieved from the contract prices data store 1130c via one or more SQL queries, RPCs, and/or the like.

A visualization of the market price and/or of the predicted fair-value price of the contract may be generated at 621. In one implementation, a graph (e.g., a curve) of the market price of the selected contract over time may be generated based on the determined market price data. In one implementation, a graph (e.g., a curve) of the fair-value price of the selected contract over time may be generated based on the determined fair-value price data. If it is determined that an uncertainty band for the fair-value price should be shown, the uncertainty band (e.g., shaded area around the curve of the fair-value price) may be generated based on the determined upper bound and lower bound fair-value prices.

The CTPV component may wait for an update event at 625. For example, an update event may indicate that the market price of the contract has changed and/or that the predicted fair-value price of the contract has changed. In one embodiment, an update event may occur based on a tick-level update to the market price of the contract (e.g., based on real-time data from an exchange). In another embodiment, an update event may occur based on a recalculation of the predicted fair-value price of the contract (e.g., based on an event).

If it is determined at 629 that an update event was received, determinations may be made whether the update event affected the market price and/or the fair-value price. If it is determined at 633 that the update event affected the market price (e.g., based on analysis of the update event), the market price portion of the visualization may be updated at 637. For example, the curve of the market price may be updated to show the new market price of the contract. If it is determined at 641 that the update event affected the fair-value price (e.g., based on analysis of the update event), the fair-value price portion of the visualization may be updated at 645. For example, the curve of the fair-value price may be updated to show the new fair-value price of the contract. In one implementation, a marker point may be generated (e.g., a circle on the curve of the fair-value price) to signify that an event caused a change in the contract's price.

Figure 7:
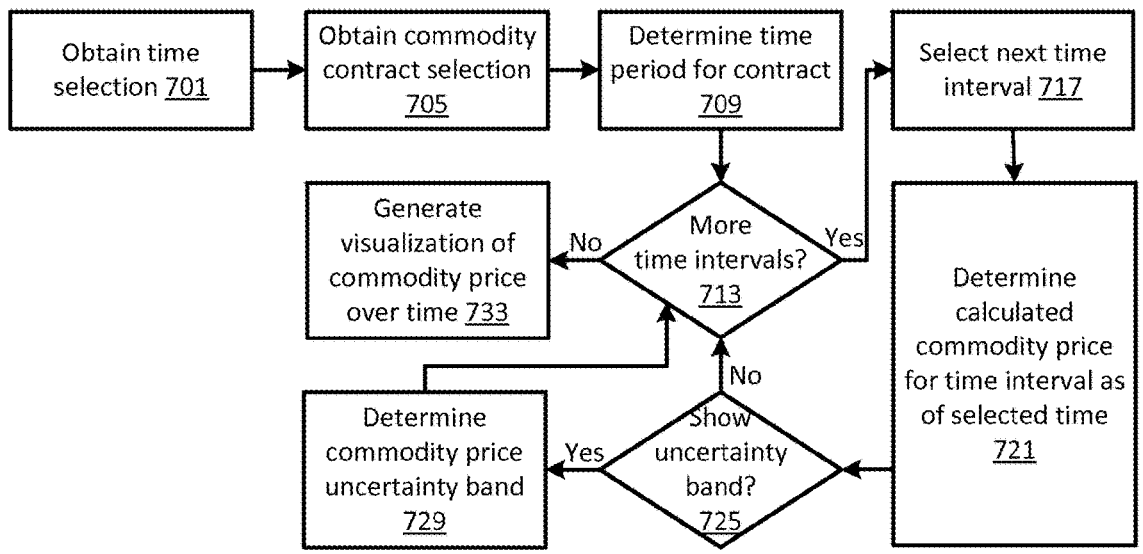
FIG. 7 shows a logic flow diagram illustrating a commodity price visualizing (CYPV) component in one embodiment of the TRAILBLAZER.

FIG. 7 shows a logic flow diagram illustrating a commodity price visualizing (CYPV) component in one embodiment of the TRAILBLAZER. In FIG. 7, a time selection may be obtained at 701. For example, a user may select an event of interest (e.g., by selecting the event in the events view, by selecting the event in the timeline view) and the date and/or time associated with the selected event may be obtained.

A commodity contract selection may be obtained at 705. For example, the identifier of the contract selected by the user (e.g., in the contract overview view) may be obtained. The time period associated with the selected contract may be determined at 709. For example, the time period for a Week Ahead contract may be the week ahead.

A determination may be made at 713 whether there are more time intervals to analyze. For example, for the Week Ahead contract, each time interval (e.g., hourly) during the time period (e.g., week ahead) for that contract may be analyzed.

If there are more time intervals to analyze, the next time interval may be selected at 717. The commodity price during the selected time interval for the commodity associated with the contract as of the time selection may be determined at 721. For example, the commodity price may be retrieved from the commodity prices data store 1130*d* via one or more SQL queries, RPCs, and/or the like.

A determination may be made at 725 whether an uncertainty band for the commodity price should be shown (e.g., based on the value of the corresponding configuration option). If so, the upper bound and lower bound commodity prices for the uncertainty band associated with the commodity price may be determined at 729. For example, the upper bound and lower bound commodity prices for the uncertainty band associated with the commodity price may be retrieved from the commodity prices data store 1130*d* via one or more SQL queries, RPCs, and/or the like.

A visualization of the commodity price (cost of supply) for the commodity associated with the contract as of the time selection may be generated at 733. In one implementation, a graph (e.g., a curve) of the commodity price over time (e.g., based on commodity price data for each time interval during the time period associated with the selected contract) may be generated based on the determined commodity price data. If it is determined that an uncertainty band for the commodity price should be shown, the uncertainty band (e.g., shaded area around the curve of the commodity price) may be generated based on the determined upper bound and lower bound commodity prices.

Figure 8:
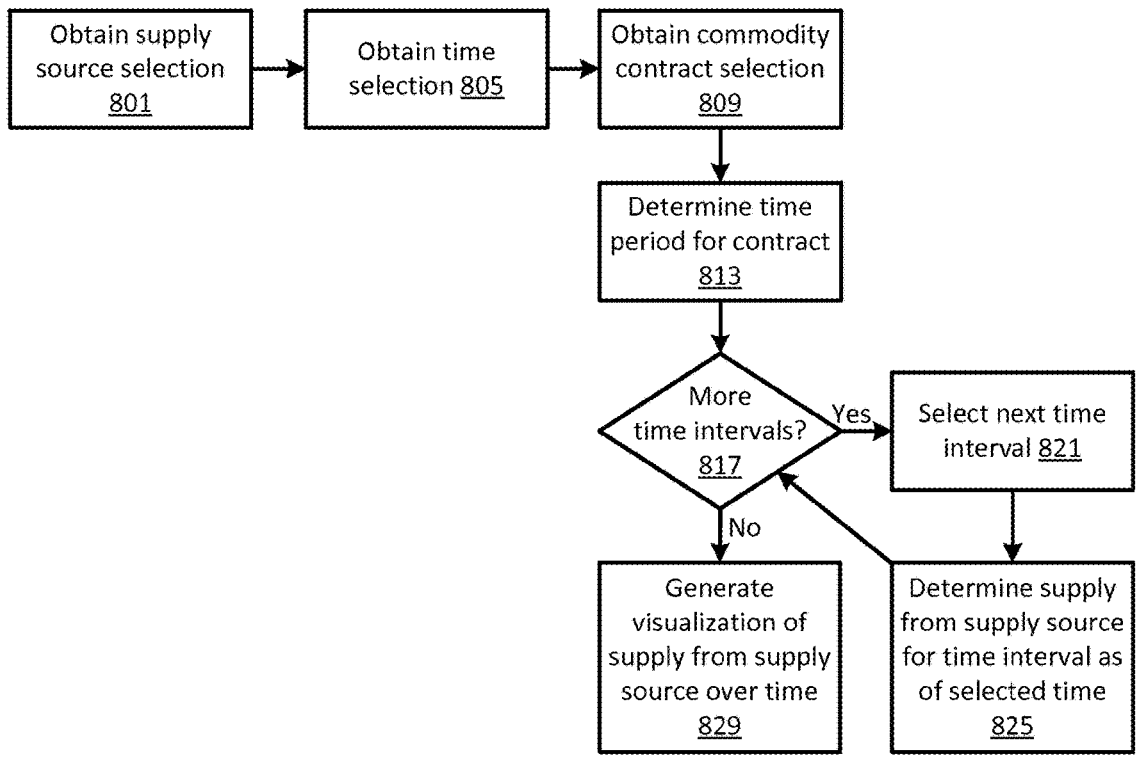
FIG. 8 shows a logic flow diagram illustrating a supply visualizing (SV) component in one embodiment of the TRAILBLAZER.

FIG. 8 shows a logic flow diagram illustrating a supply visualizing (SV) component in one embodiment of the TRAILBLAZER. In FIG. 8, a supply source selection may be obtained at 801. For example, a user may select a supplier (e.g., by clicking on the corresponding bar in the supply stack in the cross market view) and the identifier of the selected supplier may be obtained.

A time selection may be obtained at 805. For example, an event of interest selected by the user (e.g., in the events view, in the timeline view) may be determined and the date and/or time associated with the selected event may be obtained.

A commodity contract selection may be obtained at 809. For example, the identifier of the contract selected by the user (e.g., in the contract overview view) may be obtained. The time period associated with the selected contract may be determined at 813. For example, the time period for a Week Ahead contract may be the week ahead.

A determination may be made at 817 whether there are more time intervals to analyze. For example, for the Week Ahead contract, each time interval (e.g., hourly) during the time period (e.g., week ahead) for that contract may be analyzed.

If there are more time intervals to analyze, the next time interval may be selected at 821. The available capacity of the commodity associated with the contract from the selected supply source during the selected time interval as of the time selection may be determined at 825. For example, available capacity data may be retrieved from the stacks data store 1130*f* via one or more SQL queries, RPCs, and/or the like.

A visualization of the available capacity of the commodity associated with the contract from the selected supply source as of the time selection may be generated at 829. In one implementation, a graph (e.g., a curve) of the available capacity from the selected supply source over time (e.g., based on available capacity data for each time interval during the time period associated with the selected contract) may be generated based on the determined available capacity data.

Figure 9:
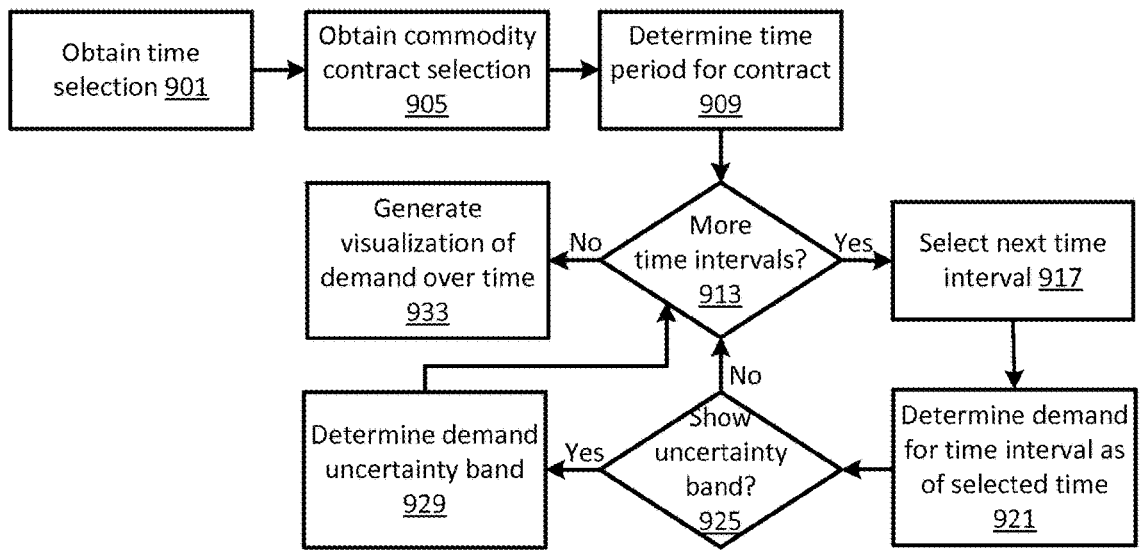
FIG. 9 shows a logic flow diagram illustrating a demand visualizing (DV) component in one embodiment of the TRAILBLAZER.

FIG. 9 shows a logic flow diagram illustrating a demand visualizing (Dv) component in one embodiment of the TRAILBLAZER. In FIG. 9, a time selection may be obtained at 901. For example, an event of interest selected by the user (e.g., in the events view, in the timeline view) may be determined and the date and/or time associated with the selected event may be obtained.

A commodity contract selection may be obtained at 905. For example, the identifier of the contract selected by the user (e.g., in the contract overview view) may be obtained. The time period associated with the selected contract may be determined at 909. For example, the time period for a Week Ahead contract may be the week ahead.

A determination may be made at 913 whether there are more time intervals to analyze. For example, for the Week Ahead contract, each time interval (e.g., hourly) during the time period (e.g., week ahead) for that contract may be analyzed.

If there are more time intervals to analyze, the next time interval may be selected at 917. The demand during the selected time interval for the commodity associated with the contract as of the time selection may be determined at 921. For example, the demand may be retrieved from the demand data store 1130*e* via one or more SQL queries, RPCs, and/or the like.

A determination may be made at 925 whether an uncertainty band for the demand should be shown (e.g., based on the value of the corresponding configuration option). If so, the upper bound demand and lower bound demand for the uncertainty band associated with the demand may be determined at 929. For example, the upper bound demand and lower bound demand for the uncertainty band associated with the demand may be retrieved from the demand data store 1130*e* via one or more SQL queries, RPCs, and/or the like.

A visualization of the demand for the commodity associated with the contract as of the time selection may be generated at 933. In one implementation, a graph (e.g., a curve) of the demand over time (e.g., based on demand data for each time interval during the time period associated with the selected contract) may be generated based on the determined demand data. If it is determined that an uncertainty band for the demand should be shown, the uncertainty band (e.g., shaded area around the curve of the demand) may be generated based on the determined upper bound demand and lower bound demand.

Figure 10:
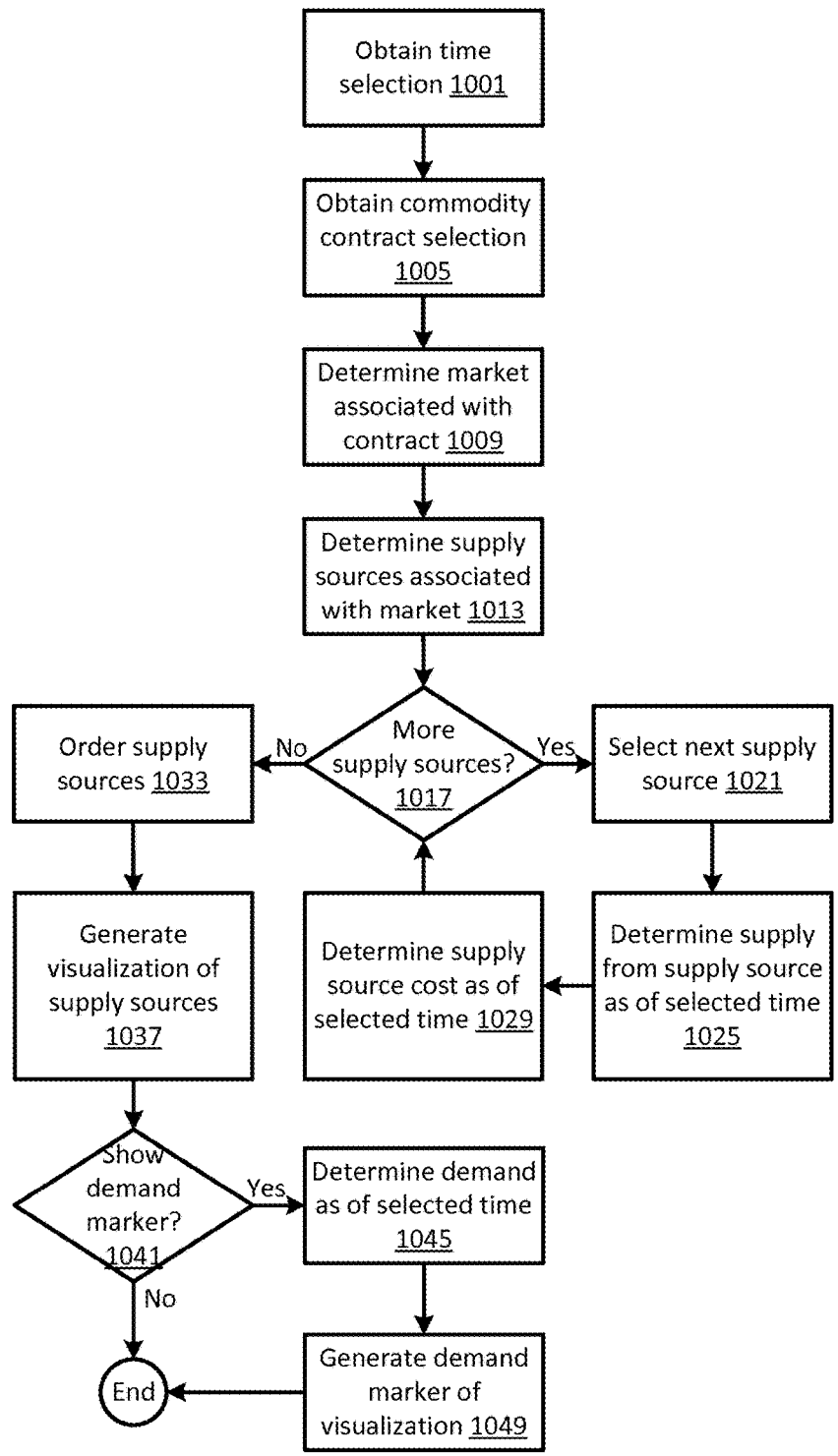
FIG. 10 shows a logic flow diagram illustrating a supply sources visualizing (SSV) component in one embodiment of the TRAILBLAZER.

FIG. 10 shows a logic flow diagram illustrating a supply sources visualizing (SSV) component in one embodiment of the TRAILBLAZER. In FIG. 10, time selection may be obtained at 1001 with regard to a time interval of interest and/or with regard to an event of interest. In one embodiment, a user may select a time interval of interest (e.g., be selecting the time interval in the profile view) and the date and/or time associated with the selected time interval (e.g., the selected hour) may be obtained. In one embodiment, an event of interest selected by the user (e.g., in the events view, in the timeline view) may be determined and the date and/or time associated with the selected event may be obtained.

A commodity contract selection may be obtained at 1005. For example, the identifier of the contract selected by the user (e.g., in the contract overview view) may be obtained. The market (e.g., Nordic electrical power market) associated with the contract may be determined at 1009. For example, information regarding the contract may be analyzed (e.g., based on the identifier of the contract) to determine the associated market. In another example, a selection associated with a filter in the contract overview view may be examined to determine the associated market.

Supply sources (suppliers) associated with the market may be determined at 1013. In one implementation, data regarding supply sources associated with the market during the selected time interval as of the time associated with the selected event may be retrieved. For example, data regarding the supply sources may be retrieved from the stacks data store 1130f via one or more SQL queries, RPCs, and/or the like. In one implementation, data stored in the stacks data store may include: forecast date (e.g., the timestamp when the estimate was made); value date range (e.g., the range of time intervals associated with the estimate—since the supply stack typically does not change every time interval, a range of value dates having identical supply stack may be specified); supply stack data (e.g., an object that contains data regarding suppliers in the supply stack). In one implementation, supply stack data may include the following data for each supplier: supplier identifier (e.g., the identifier of one or more (e.g., organized into a group) suppliers); supplier name (e.g., the name associated with the supplier); available capacity (e.g., available capacity for the supplier); installed capacity (e.g., the maximum installed capacity for the supplier); supplier cost (e.g., cost associated with the supplier). In one implementation, data stored in the stacks data store may be stored as gzip-compressed JSON-objects substantially in the following form:

```
{
    "marketId":"ENO",
    "forecastDate":1358812800000,
    "fromDate":1375653600000,
    "toDate":1375801200000,
    "stack":
    [
        {
            "supplierId":[525],
            "supplierName":"Lillgrund",
            "supplierCost":1.00,
```

-continued

```
            "availableCapacity":110.0
            "installedCapacity":110.0
        },
        {
            " supplierId ":[100109222,100110318,600,
            100183527,470,100108529],
            "supplierName":"NO4 Res: Siso and 5 others",
            "supplierCost":32.47,
            "availableCapacity":675.0
            "installedCapacity":700.0
        }
    ]
}
```

A determination may be made at 1017 whether there are more supply sources to analyze. If so, the next supply source may be selected for analysis at 1021. The supply source's available capacity during the selected time interval as of the time associated with the selected event may be determined at 1025. In one implementation, the width of the bar associated with the supply source may correspond to the amount of the supply source's available capacity. The supply source's cost during the selected time interval as of the time associated with the selected event may be determined at 1029. In one implementation, the height of the bar associated with the supply source may correspond to the supply source's cost.

The supply sources may be ordered at 1033. In one implementation, the supply sources may be ordered based on cost. For example, the supply sources may be ordered from least expensive to most expensive.

A visualization of the supply sources may be generated at 1037. In one embodiment, a graph of the supply stack (e.g., as bars) in which each bar represents a supply source may be generated based on the determined data regarding the supply sources. In one implementation, the bars may be ordered based on cost. In one embodiment, an outline of the composition of the supply stack may be generated. If the user selected another event of interest, an outline of the composition of the supply stack that takes into account the effect of the other event (e.g., the outline of the composition of the supply stack before the first event) may be generated.

A determination may be made at 1041 whether a demand marker should be shown (e.g., based on the value of the corresponding configuration option). In one embodiment, the demand marker represents predicted demand for the commodity associated with the contract during the selected time interval as of the time associated with the selected event. If so, the demand may be determined at 1045. If an uncertainty band for the demand should be shown, the upper bound demand and lower bound demand for the uncertainty band may be determined. For example, demand data may be retrieved from the demand data store 1130e via one or more SQL queries, RPCs, and/or the like. The demand marker of the visualization may be generated at 1049. In one embodiment, a (e.g., vertical) demand marker may be generated based on the determined demand data.

Detailed Description of the Trailblazer Coordinator

Figure 11:
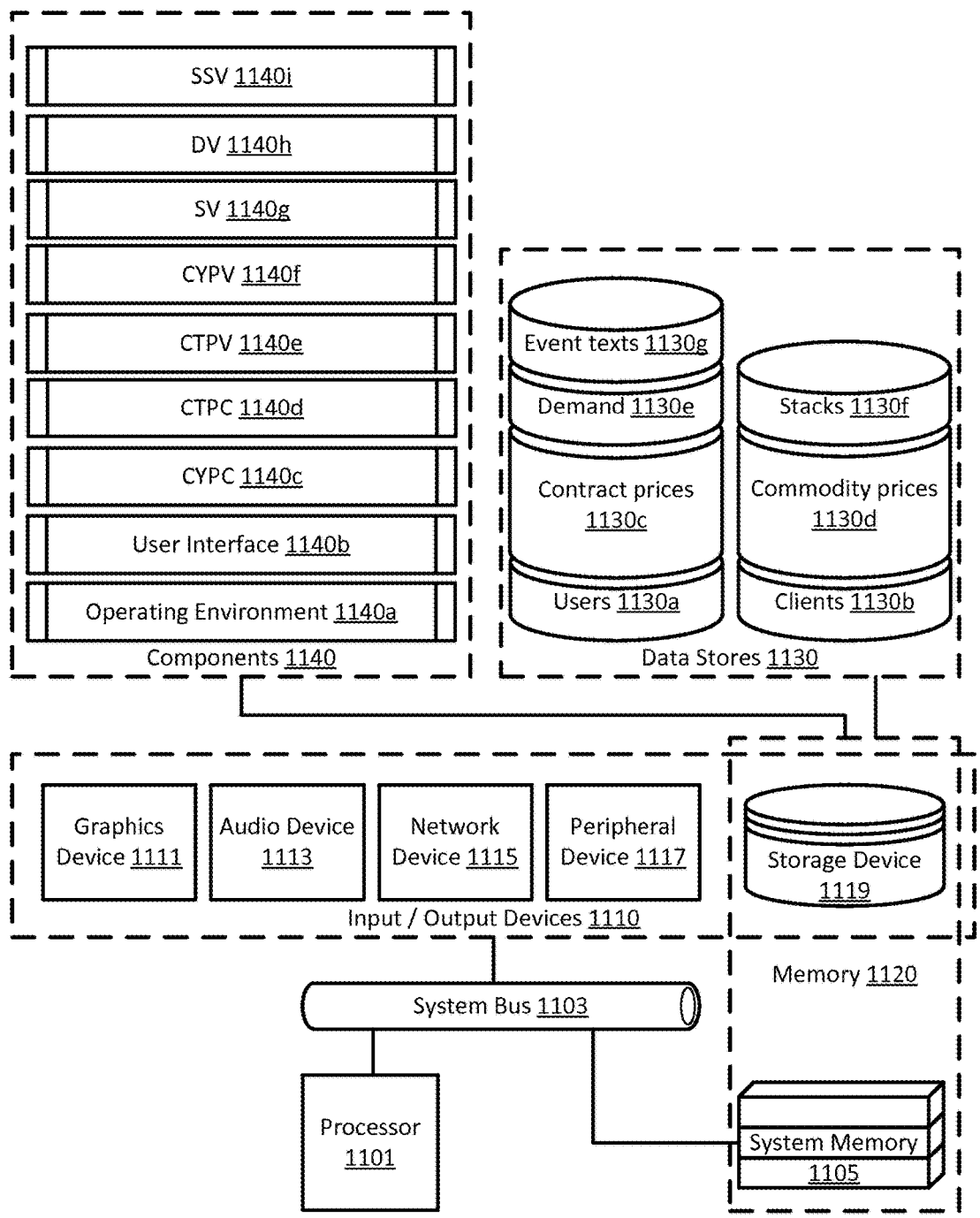
FIG. 11 shows a block diagram illustrating an exemplary TRAILBLAZER coordinator in one embodiment of the TRAILBLAZER.

FIG. 11 shows a block diagram illustrating an exemplary TRAILBLAZER coordinator in one embodiment of the TRAILBLAZER. The TRAILBLAZER coordinator facilitates the operation of the TRAILBLAZER via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the TRAILBLAZER coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the TRAILBLAZER coordinator may comprise a standalone computer system, a distributed computer system, a node in a computer network (i.e., a network of computer systems organized in a topology), a network of TRAILBLAZER coordinators, and/or the like. It is to be understood that the TRAILBLAZER coordinator and/or the various TRAILBLAZER coordinator elements (e.g., processor, system bus, memory, input/output devices) may be organized in any number of ways (i.e., using any number and configuration of computer systems, computer networks, nodes, TRAILBLAZER coordinator elements, and/or the like) to facilitate TRAILBLAZER operation. Furthermore, it is to be understood that the various TRAILBLAZER coordinator computer systems, TRAILBLAZER coordinator computer networks, TRAILBLAZER coordinator nodes, TRAILBLAZER coordinator elements, and/or the like may communicate among each other in any number of ways to facilitate TRAILBLAZER operation. As used in this disclosure, the term "user" refers generally to people and/or computer systems that interact with the TRAILBLAZER; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The TRAILBLAZER coordinator includes a processor 1101 that executes program instructions (e.g., TRAILBLAZER program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 1105 via a system bus 1103. The system bus may interconnect these and/or other elements of the TRAILBLAZER coordinator via electrical, electronic, optical, wireless, and/or the like communication links (e.g., the system bus may be integrated into a motherboard that interconnects TRAILBLAZER coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., TRAILBLAZER program instructions) executed by the processor. The system memory may facilitate accessing, storing, retrieving, modifying, deleting, and/or the like data (e.g., TRAILBLAZER data) by the processor.

In various embodiments, input/output devices 1110 may be connected to the processor and/or to the system memory, and/or to one another via the system bus.

In some embodiments, the input/output devices may include one or more graphics devices 1111. The processor may make use of the one or more graphic devices in accordance with program instructions (e.g., TRAILBLAZER program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., TRAILBLAZER data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 1113. The processor may make use of the one or more audio devices in accordance with program instructions (e.g., TRAILBLAZER program instructions) executed by the processor. In one implementation, an audio device may be a sound card that may obtain (e.g., via a connected microphone), process, output (e.g., via connected speakers), and/or the like audio data (e.g., TRAILBLAZER data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 1115. The processor may make use of the one or more network devices in accordance with program instructions (e.g., TRAILBLAZER program instructions) executed by the processor. In one implementation, a network device may be a network card that may obtain (e.g., via a Category 5 Ethernet cable), process, output (e.g., via a wireless antenna), and/or the like network data (e.g., TRAILBLAZER data). A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 1117. The processor may make use of the one or more peripheral devices in accordance with program instructions (e.g., TRAILBLAZER program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the TRAILBLAZER coordinator with a variety of input, output and processing capabilities.

In some embodiments, the input/output devices may include one or more storage devices 1119. The processor may access, read from, write to, store in, erase, modify, and/or the like a storage device in accordance with program instructions (e.g., TRAILBLAZER program instructions) executed by the processor. A storage device may facilitate accessing, storing, retrieving, modifying, deleting, and/or the like data (e.g., TRAILBLAZER data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 1105 and the one or more storage devices 1119 may be referred to as memory 1120 (i.e., physical memory).

TRAILBLAZER memory 1120 contains processor-operable (e.g., accessible) TRAILBLAZER data stores 1130. Data stores 1130 comprise data that may be used (e.g., by the TRAILBLAZER) via the TRAILBLAZER coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, TRAILBLAZER coordinator elements, and/or the like) to facilitate TRAILBLAZER operation. For example, TRAILBLAZER data stores may comprise data stores 1130*a-g* implemented as one or more databases. A users data store 1130*a* may be a collection of database tables that include fields such as UserID, UserName, UserPreferences, and/or the like. A clients data store 1130*b* may be a collection of database tables that include fields such as ClientID, ClientName, ClientDeviceType, ClientScreenResolution, and/or the like. A contract prices data store 1130*c* may be a collection of database tables that include fields such as ContractID, ForecastDate, ValueDate, Value, and/or the like. A commodity prices data store 1130*d* may be a collection of database tables that include fields such as EstimateID, ForecastDate, ValueDate, Value, and/or the like. A demand data store 1130*e* may be a collection of database tables that include fields such as EstimateID, ForecastDate, ValueDate, Value, and/or the like. A stacks data store 1130*f* may be a collection of database tables that include fields such as MarketID, ForecastDate, FromDate, ToDate, StackID, SupplierID, SupplierName, SupplierAvailableCapacity, SupplierInstalledCapacity, SupplierCost, and/or the like. An event texts data store 1130*g* may be a collection of database tables that include fields such as ContractID, ForecastDate, ValueDate, EventText, and/or the like. The TRAILBLAZER coordinator may use data stores 1130 to keep track of inputs, parameters, settings, variables, records, outputs, and/or the like.

TRAILBLAZER memory 1120 contains processor-operable (e.g., executable) TRAILBLAZER components 1140. Components 1140 comprise program components (including program instructions and any associated data stores) that are executed (e.g., by the TRAILBLAZER) via the TRAILBLAZER coordinator (i.e., via the processor) to transform TRAILBLAZER inputs into TRAILBLAZER outputs. It is to be understood that the various components and their subcomponents, capabilities, applications, and/or the like may be organized in any number of ways (i.e., using any number and configuration of components, subcomponents, capabilities, applications, TRAILBLAZER coordinator elements, and/or the like) to facilitate TRAILBLAZER operation. Furthermore, it is to be understood that the various components and their subcomponents, capabilities, applications, and/or the like may communicate among each other in any number of ways to facilitate TRAILBLAZER operation. For example, the various components and their subcomponents, capabilities, applications, and/or the like may be combined, integrated, consolidated, split up, distributed, and/or the like in any number of ways to facilitate TRAILBLAZER operation. In another example, a single or multiple instances of the various components and their subcomponents, capabilities, applications, and/or the like may be instantiated on each of a single TRAILBLAZER coordinator node, across multiple TRAILBLAZER coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 1140 may include an operating environment component 1140*a*. The operating environment component may facilitate operation of the TRAILBLAZER via various subcomponents.

In some implementations, the operating environment component may include an operating system subcomponent. The operating system subcomponent may provide an abstraction layer that facilitates the use of, communication among, common services for, interaction with, security of, and/or the like of various TRAILBLAZER coordinator elements, components, data stores, and/or the like.

In some embodiments, the operating system subcomponent may facilitate execution of program instructions (e.g., TRAILBLAZER program instructions) by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the TRAILBLAZER. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the TRAILBLAZER coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the TRAILBLAZER coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the TRAILBLAZER by providing user interface elements that may be used by the TRAILBLAZER to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Microsoft Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate TRAILBLAZER capabilities such as storage, analysis, retrieval, access, modification, deletion, aggregation, generation, and/or the like of data (e.g., the use of data stores 1130). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, and/or the like.

In some implementations, the operating environment component may include an information handling subcomponent. The information handling subcomponent may provide the TRAILBLAZER with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, TRAILBLAZER components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 1130) via the database subcomponent.

In some embodiments, the information handling subcomponent may facilitate presentation of information obtained from users, TRAILBLAZER components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate TRAILBLAZER message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, a custom protocol, and/or the like to facilitate TRAILBLAZER message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates TRAILBLAZER security. In some embodiments, the security subcomponent may restrict access to the TRAILBLAZER, to one or more services provided by the TRAILBLAZER, to data associated with the TRAILBLAZER (e.g., stored in data stores 1130), to communication messages associated with the TRAILBLAZER, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the TRAILBLAZER may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates TRAILBLAZER virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 1140 may include a user interface component 1140*b*. The user interface component may facilitate user interaction with the TRAILBLAZER by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 1140 may include any of the components CYPC 1140c, CTPC 1140d, CTPV 1140e, CYPV 1140f, SV 1140g, DV 1140h, SSV 1140i described in more detail in preceding figures.

The Embodiments of the Trailblazer

The entirety of this disclosure (including the written description, figures, claims, abstract, appendices, and/or the like) for TRAILBLAZER METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the TRAILBLAZER coordinator, TRAILBLAZER coordinator elements, TRAILBLAZER data stores, TRAILBLAZER components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the TRAILBLAZER coordinator, TRAILBLAZER coordinator elements, TRAILBLAZER data stores, TRAILBLAZER components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the TRAILBLAZER discussed in this disclosure have been directed to modeling electrical power markets, the innovations described in this disclosure may be readily applied to a wide variety of other fields and/or applications.

What is claimed is:

1. A method for providing a real-time interactive visualization of futures contract data, the method comprising:
   storing, in a real-time database, updated futures contract data related to a plurality of futures contracts relating to a commodity, the futures contract data including commodity prices data, contract prices data, supplier data, supply data, demand data, contract timing data, current market data and event data;
   operating a model server coupled to the real-time database to determine a predicted fair value for the plurality of futures contracts based on the data related to the futures contracts as updated in real-time;
   receiving from a client via a web API a request for a graphical user interface for accessing said predicted fair value for said plurality of futures contracts;
   in response to said request, executing, by a web server coupled to the database and to the model server, a web based application operative to generate said graphical user interface for said client accessing the application via a web browser provided by a user interface component, the graphical user interface providing interface elements allowing the client to select a particular futures contract and to select at least one distinct view of data related to the selected futures contract, the at least one distinct view of the data including at least one of:
      an events view including events that caused a change in the predicted fair value for the selected future contract;
      a timeline view including a graph of at least one of the predicted fair value of the selected contract and a market price of the selected contract over a time period associated with the selected contract;
      a marginal cost view including a predicted cost of supply curve for the time period associated with the selected contract; and
      a market cross view including a representation of output capacity of a plurality of supply sources, wherein the user interface component causes the user interface to display additional information pertaining to the output capacity of a particular supply source responsive to a user selection of the particular supply source and to display in a pop up window, an identity of the particular supply source and at least one of a production capacity of the particular supply source, and a cost associated with the particular supply source;
   receiving from a user a selection of a particular futures contract and a selection of said at least one distinct view of data related to the particular futures contract;
   accessing the real-time database and model server to retrieve futures contract data related to the selected particular futures contract to generate the selected at least one distinct view of data; and
   rendering the selected at least one distinct view of data, and further wherein the graphical user interface is arranged such that the user can select an event of interest to show updated futures contract data in a further view of data such that an analysis of an effect of an event on futures contract data is substantially facilitated.

2. The method of claim 1, wherein the graphical user interface is programmed to display the supply data, and further wherein the supply data include a list of suppliers associated with the futures contract and at least one of (i) fuel type, (ii) cost based on fuel price or weather (iii) geographic location, (iv) installed capacity and (v) outages.

3. The method of claim 2, wherein the list of suppliers is aggregated into a predetermined number of groups.

4. The method of claim 1, wherein the demand data includes at least one of (i) commodity demand information for the market and (ii) commodity demand information, for different price areas within the market.

5. The method of claim 1, wherein the contract timing data is specified in a data store.

6. The method of claim 1, wherein the predicted fair value is calculated based on an intersection point of a supply curve and a demand curve, wherein the supply curve is formed based on data regarding available capacity and cost, and further wherein the demand curve is formed based on estimated demand at a future time.

7. The method of claim 1, further comprising determining an uncertainty band for the predicted fair value of the futures contract and displaying the uncertainty band with said at least one distinct view.

8. The method of claim 7, further comprising determining an upper bound and a lower bound of the uncertainty band.

9. The method of claim 1, wherein the supply data includes an indication of available capacity of the commodity from a supply source and the indication is expressed in the at least one distinct view as a graphic having a width, wherein the width of the graphic corresponds to the indication of available capacity.

10. The method of claim 9, wherein the graphic has a height, and further wherein the height of the graphic corresponds to the cost of the commodity.

11. The method of claim 1, wherein the at least one distinct view includes information relating to the plurality of supply sources.

12. The method of claim 1, wherein the supply data includes an indication of available capacity of the commodity from the plurality of supply sources and the indication is expressed in the at least one distinct view as a graphic having a width, wherein the available capacity from each supply source is expressed as a slice of the graphic, wherein the width of the slice corresponds to the indication of available capacity.

13. The method of claim 1, wherein the supply data includes an indication of cost of the commodity from the plurality of supply sources and the indication is expressed in the at least one distinct view as a graphic having a height, wherein the cost from each supply source is expressed as a slice of the graphic, wherein the height of the slice corresponds to the cost of the commodity from the supply source.

14. A system for providing a real-time interactive visualization of futures contract data, the system comprising:
   a real-time database including updated futures contract data related to a plurality of futures contracts relating to a commodity, the futures contract data including commodity prices data, contract prices data, supplier data, supply data, demand data, contract timing data, current market data and event data;
   a model server coupled to the real-time database operative to determine a predicted fair value for the plurality of futures contracts based on based on the data related to the futures contracts as updated in real-time;
   a web server coupled to the database and to the model server, the web server executing a web-based application operative to:
      receive from a client via a web API a request for a graphical user interface for accessing said predicted fair value for said plurality of futures contracts;
      in response to said request, generate said graphical user interface for said client accessing the application via a web browser provided by a user interface component, the graphical user interface providing at least one interface element allowing the client to select a particular futures contract and to select at least one distinct view of data related to the selected futures contract, the at least one distinct view of the data including at least one of:
         an events view including events that caused a change in the predicted fair value for the selected future contract;
         a timeline view including a graph of at least one of the predicted fair value of the selected contract and a market price of the selected contract over a time period associated with the selected contract;
         a marginal cost view including a predicted cost of supply curve for the time period associated with the selected contract; and
         a market cross view including a representation of output capacity of a plurality of supply sources, wherein the user interface component causes the user interface to display additional information pertaining to the output capacity of a particular supply source responsive to a user selection of the particular supply source and to display in a pop up window, an identity of the particular supply source and at least one of a production capacity of the particular supply source, and a cost associated with the particular supply source;
      receive from a user a selection of a particular futures contract and a selection of said at least one distinct view of data related to the particular futures contract;
   access the real-time database and model server to retrieve futures contract data related to the selected particular futures contract required to generate the selected at least one distinct view; and
   render the selected at least one distinct view of data in the graphical user interface, and wherein the graphical user interface is arranged such that the user can select an event of interest in the at least one distinct view of data to show updated futures contract data in a further view within the graphical user interface such that an analysis of an effect of an event on futures contract data is substantially facilitated.

15. The system of claim 14, wherein the graphical user interface initially presents to the client a contract overview view that shows a list of contracts that may be analyzed by the client.

16. The system of claim 14, wherein the graphical user interface is configured to render at least an events view and a timeline view simultaneously.

17. The system of claim 14, wherein the graphical user interface is further configured to render at least one uncertainty band for values shown.

18. The system of claim 14, wherein the graphical user interface is configured and adapted to render at least an event view and a marginal cost view simultaneously.

19. The system of claim 14, wherein the graphical user interface is operative to respond to selection of an event in an events view to show a curve of marginal cost for a period associated with the selected contract that takes into account an effect of the event.

* * * * *